United States Patent [19]

Knudson et al.

[11] Patent Number: 4,769,753
[45] Date of Patent: Sep. 6, 1988

[54] COMPENSATED EXPONENTIAL VOLTAGE MULTIPLIER FOR ELECTROLUMINESCENT DISPLAYS

[75] Inventors: Orlin B. Knudson, Vadnais Heights; Alexander J. Neudeck, St. Paul, both of Minn.

[73] Assignee: Minnesota Mining and Manufacturing Company, St. Paul, Minn.

[21] Appl. No.: 69,422

[22] Filed: Jul. 2, 1987

[51] Int. Cl.⁴ ............................................. H02M 3/18
[52] U.S. Cl. ............................................. 363/60; 320/1; 307/110
[58] Field of Search ................ 363/59, 60, 61; 320/1; 307/110

[56] References Cited

U.S. PATENT DOCUMENTS

| | | | |
|---|---|---|---|
| 3,467,849 | 9/1969 | Wilson | 307/110 |
| 3,581,098 | 5/1971 | Hoover | 363/60 |
| 3,962,591 | 6/1976 | Popka | 363/60 |
| 4,028,596 | 6/1977 | Weber | 363/60 |
| 4,068,148 | 1/1978 | Nomiya et al. | 307/33 |
| 4,110,664 | 8/1978 | Asars et al. | 315/169 TV |
| 4,149,232 | 4/1979 | Eaton, Jr. | 363/60 |
| 4,194,214 | 3/1980 | Awane et al. | 357/41 |
| 4,206,460 | 6/1980 | Yasuda et al. | 340/781 |
| 4,253,097 | 2/1981 | Hochstrate | 340/781 |
| 4,254,362 | 3/1981 | Tulleners | 315/219 |
| 4,290,100 | 9/1981 | Squires | 363/60 |
| 4,319,164 | 3/1982 | Tulleners | 315/219 |
| 4,349,816 | 9/1982 | Miller et al. | 340/781 |
| 4,406,997 | 9/1983 | Depp et al. | 340/718 |
| 4,442,481 | 4/1984 | Brahmbhatt | 363/60 |
| 4,449,075 | 5/1984 | D'Onofrio et al. | 315/169.3 |
| 4,456,909 | 6/1984 | Takahara et al. | 340/781 |
| 4,457,089 | 7/1984 | Phillips, Jr. | 40/544 |
| 4,468,659 | 8/1984 | Ohba et al. | 340/719 |
| 4,479,120 | 10/1984 | Ohba et al. | 340/781 |
| 4,485,379 | 11/1984 | Kinoshita et al. | 340/781 |
| 4,523,189 | 6/1985 | Takahara et al. | 340/781 |
| 4,527,096 | 7/1985 | Kindlmann | 315/169.3 |
| 4,554,539 | 11/1985 | Graves | 340/805 |
| 4,595,861 | 6/1986 | Simopoulos et al. | 315/169.3 |
| 4,611,150 | 9/1986 | Ball et al. | 315/307 |
| 4,636,930 | 1/1987 | Bingham et al. | 363/60 |

Primary Examiner—Patrick R. Salce
Assistant Examiner—Anita M. Ault
Attorney, Agent, or Firm—Donald M. Sell; William B. Barte

[57] ABSTRACT

An exponential multiplication power supply is described which is comprised of a plurality of stages each having the ability to store energy and each having a plurality of states, including at least a store state and a stack state. The plurality of stages are arranged in a network such that an input stage in the network is connected to receive a voltage from an external power source and all subsequent stages are connected to at least one other stage for receiving voltage from and through the other stages. A control mechanism is attached to the network stages and operates to place these stages in a repeating sequence of states such that at least one of the stages receives a voltage which is the sum of the voltages stored in at least two other stages. When a stage is receiving voltage or holding voltage it is said to be in the store state, and when a stage is combined with other stages to present an increased voltage, it is said to be placed in the stack state. This exponential voltage multiplication power supply is applied to the production of high voltage for exciting electroluminescent panels. The application of this power supply includes compensation circuitry to vary the excitation in response to varying characteristics of the electroluminescent panel.

25 Claims, 14 Drawing Sheets

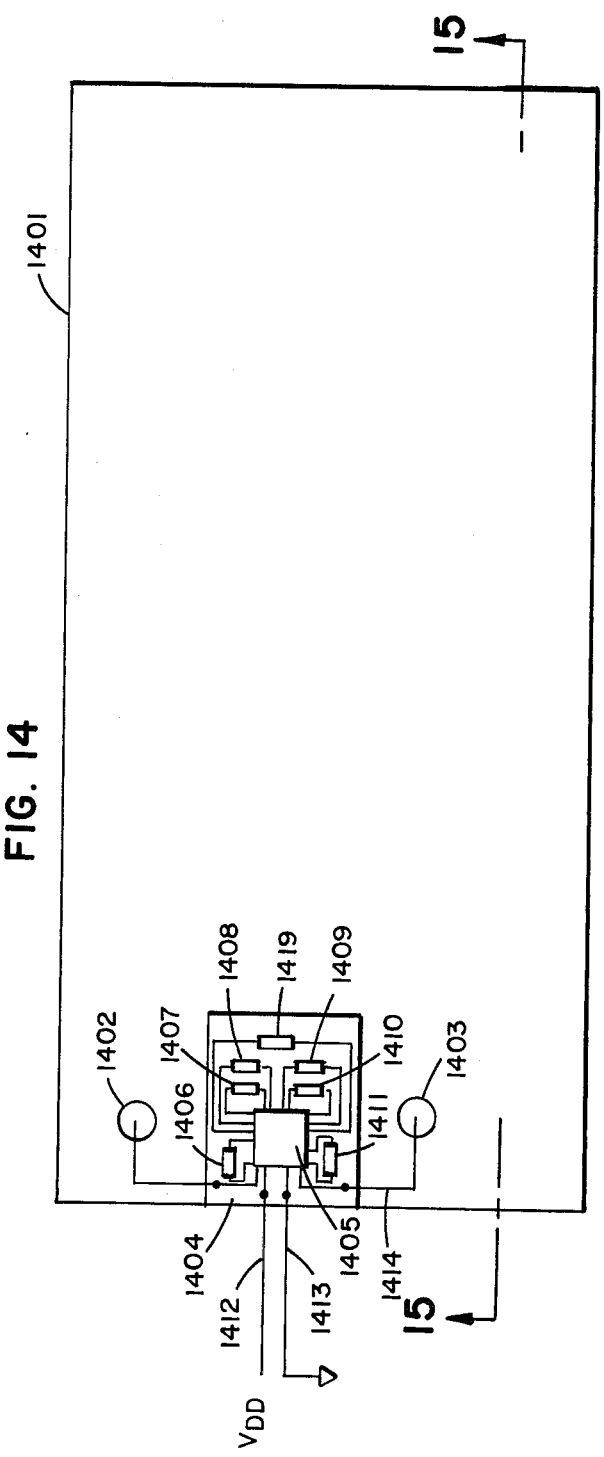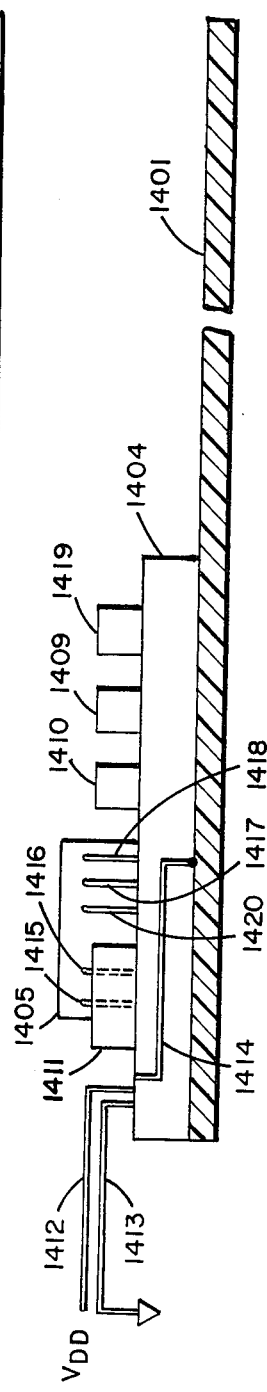
FIG. 14
FIG. 15

COMPENSATED EXPONENTIAL VOLTAGE MULTIPLIER FOR ELECTROLUMINESCENT DISPLAYS

FIELD OF THE INVENTION

The present invention relates to power supply and voltage conversion systems. While having many potential applications, in one application the present invention relates to the application of DC to AC voltage multipliers for electroluminescent displays having compensation to correct for the changing characteristics of electroluminescent panels over time.

BACKGROUND OF THE INVENTION

Electroluminescent (EL) panels are well known in the art and are used in various applications where a low level of light output is adequate for displays, backlighting or background lighting. Typically, electroluminescent panels are constructed from a sandwich of an opaque planar conductor covered with a phosphorescent insulating compound which in turn is covered with a planar transparent or translucent conductor. An AC voltage potential placed between the two conducting plates causes an excitation of the electrons of the phosphor within the panel, which upon relaxation emit light in the visible spectrum. Electrical potential between the plates is applied as a switched or pulsed AC voltage which upon transition from zero to voltage, voltage to voltage, or voltage to zero levels cause an emission of light from the electroluminescent panel.

Voltage conversion circuits are known in the prior art for driving electroluminescent panels from DC power supply sources. Some prior art power supply sources provide a fixed voltage and fixed waveform to the electroluminescent panel throughout the life of the panel. However, electroluminescent panels age over time. The consequence of the aging is that the panels emit variable or reduced radiation in the visible spectrum as time increases. Variation in visible radiation reduces the commercial or useful life of the panel.

The full effect of power supplies on the rate of panel aging is unknown. The rate of aging is dependent on potential applied across the EL panel, duty cycle of the applied potential, frequency of the applied potential, temperature, humidity, ambient light impinging on the panel, and effective magnitude of the applied potential. However, applied panel driving potentials with small duty cycles and zero effective DC bias are not believed to increase the rate of panel aging. Presently available commercial electroluminescent power supplies or DC to AC inverters do not adequately compensate for this change in panel brightness.

The electroluminescent panel may be modeled electrically as a resistor and capacitor in parallel. The light output of the electroluminescent panel is roughly proportional to the capacitance of the panel. Both resistor and capacitor values change as a function of time, temperature, humidity, applied potential and other factors. Also, it is known that a non-zero DC bias in the driving potential increases the rate of aging of the electroluminescent panel. Prior art power supplies do not actively measure the changing light output or capacitance and compensate for this change with an increased zero bias driving potential. Most of the recent prior art inverters utilize the fact that the electroluminescent panel acts as a parallel capacitor and resistor and hence place this panel in series with an inductor to form a resonant LC circuit. The inverter power supply then drives the panel at resonance. The combination of the passive compensation technique and the power supplies of the prior art inverters results in a distorted sinusoidal driving voltage which can result in a long term effective DC bias placed across the panel which in turn increases aging.

SUMMARY OF THE INVENTION

In the preferred embodiment of the present invention, an exponential multiplication power supply is described which is comprised of a plurality of stages arranged in a network, each stage having the ability to store energy and each stage having a plurality of states including at least store state and a stack state. The plurality of stages together with means for controlling the placement of the stages in the respective states are arranged in the network such that an input stage in the network is connected to receive a voltage from an external voltage source. All of the stages within the network other than the input stage are connected to at least one other stage for receiving voltage from and through the other stages. The control means is attached to the network and the various stages within the network and operates to place these stages in at least one of the states, including a store state and a stack state. The control means controls the network such that at least one of the stages is placed in a store state while at least two other stages are placed in a stack state. The stage that is placed in a store state receives a voltage which approximately equal to the sum of the voltages on the driving stages that are placed in the stack state. When so arranged, the network produces a voltage which is higher in magnitude than the original supply voltage from the voltage source as a result of stacking stages.

In an alternate preferred embodiment of the present invention, an exponential voltage multiplication power supply is described which is arranged as a series network of charge storage elements positioned to receive a low DC voltage on one end of the series network and to deliver a higher DC voltage on the other end of the series network. The control means operates to exponentially multiply the voltage through each stage of the series network. The output stage of the series network is connected through a connection means which switches the higher DC voltage into at least one pulse to drive an electroluminescent panel such that the electroluminescent panel radiates.

In a more particular embodiment of the present invention, a compensation feedback network is included which senses the changing characteristics of the electroluminescent panel and modifies the magnitude of the higher DC voltage as applied to the electroluminescent panel to counteract the effects of changing characteristics. In another more particular embodiment of the present invention, the compensation feedback network which senses the changing characteristics of the EL panel operates to modify the width of the pulse as it is applied to the EL panel to counteract the effects of the changing characteristics. Alternate means of detecting changing characteristics in electroluminescent panels sense the current through the EL panel or optically sense the radiation output of the EL panel.

BRIEF DESCRIPTION OF THE DRAWINGS

In the drawings, where like numerals refer to like components throughout the several views:

FIG. 14 depicts a top view of an EL panel having the exponential power supply mounted directly thereon; and FIG. 15 is an expanded side view of the electroluminescent panel of FIG. 14 along line 15—15.

DESCRIPTION OF THE PREFERRED EMBODIMENT

Figure 1:
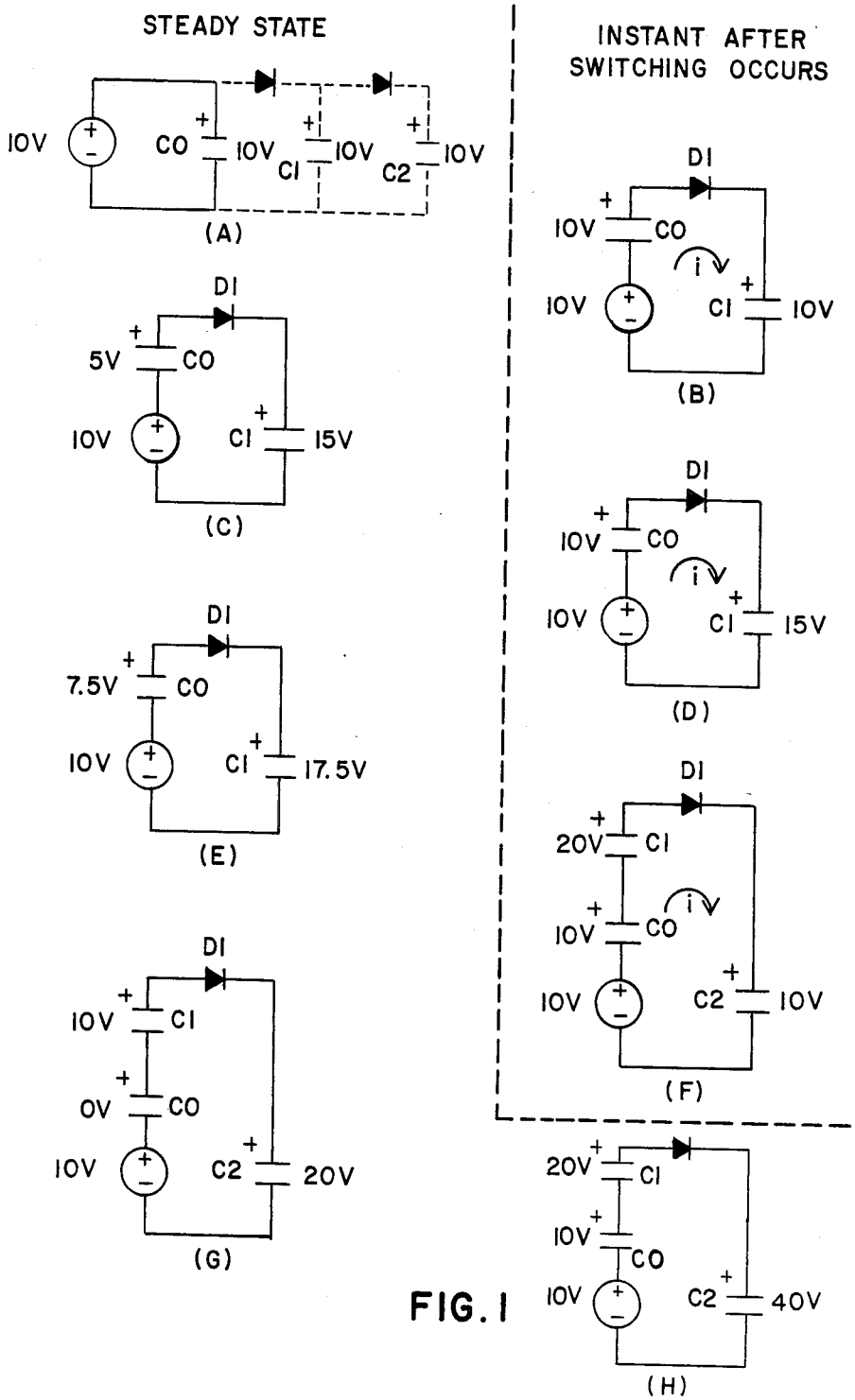
FIG. 1 is a diagram depicting the theoretical operation of the voltage multiplier on a series of capacitors during the store and stack states.

The preferred embodiment of the present invention is a power supply which delivers a higher DC voltage from a low DC voltage which is then switched into a three-state driving potential comprised of a positive-going pulse followed by a negative-going pulse followed by a relaxation state for exciting an electroluminescent (EL) panel. In one implementation, The power supply monitors the current through the EL panel and adjusts the driving potential and pulse width, holding the product of applied potential and capacitance relatively constant, to compensate for the change in radiation due to panel aging. The ability to change the driving potential prolongs the useful commercial life of the EL panel by maintaining the same light intensity output over time. The ability to change the pulse width of the applied potential conserves power and is believed to prolong the useful commercial life of the electroluminescent panels by counteracting the acceleration of aging caused by increased drive potential on aged panels. This compensation technique provides for a more even radiation (light) output over time as the panels age.

The power supply circuit of the present invention is based on converting a low DC voltage to a higher DC voltage through a series network comprising a plurality of switched capacitor networks. Once a higher DC voltage is established on an output capacitor, it is switched through to the electroluminescent panel at a rate of approximately 400 Hz using the aforementioned three-state wave form. When switched properly, the electroluminescent panel is driven by positive high voltage, a negative high voltage and a zero voltage during each period. In the preferred embodiment, the voltage multiplication section of the power supply multiplies the voltage substantially exponentially approaching the formula $V_{out}=V_{in}\times 2^n$ where n is the number of stages of switched capacitor networks in the voltage multiplier circuit. Each switched capacitor stage operates either in a store state or a stack state such that the stage of the switched capacitor networks can be stacked in one state to create a higher voltage for charging the subsequent stages in the store state. Thus, the voltage is multiplied exponentially through this series of stages to obtain a higher voltage DC output with a minimum number of capacitors.

An application of the preferred embodiment of the present invention is the excitation of electroluminescent panels commonly used in the automobile industry as dashboard panel lighting and the like. In an automobile environment, the available power supply takes the form of battery voltage augmented by a generator or alternator mounted on the engine. This supply voltage is typically 13.6 volts DC which is used to power the exponential voltage multiplication power supply of the preferred embodiment of the present invention. The application of electroluminescent panels to environments other than in the automobile industry is well understood by those skilled in the art, and it will be understood by the reading and understanding of the present specification along with the drawings that the present invention is applicable to these other applications.

It will also be understood by those skilled in the art upon reading and understanding the present specification and drawings that the exponential voltage multiplication power supply is adaptable for use in other art areas such as the application to TENS (transcutaneous electrical nerve stimulator) devices, implantable defibrillators, photo flash or strobe flash units, and other art areas where a low DC voltage is available and the application requires the multiplication to a higher voltage.

In addition, within the illumination art areas, the exponential voltage multiplication power supply may be applicable to liquid crystal displays (LCDs), gas discharge displays, fluorescent displays, and other types of EL display panels used for conveying information. In addition, some electroluminescent panels use only DC voltage as an excitation mechanism. Since the present voltage multiplication power supply produces as its output a higher DC voltage, this voltage may be applied to EL panels without the requirement of switching the voltage into pulses.

In discussing the preferred embodiment of the present power supply, the present application generally refers to capacitors when discussing the stages of the circuit which store energy; however, it will be recognized by those skilled in the art that other energy storage devices such as inductors may also be used.

The motivation of using the preferred embodiment of the present invention for producing exponentially higher DC voltages is that the number of capacitors required to perform the voltage multiplication is minimized. This allows the entire multiplication and control circuitry, except for the capacitors, to be mounted on a single silicon integrated circuit die using currently available integration techniques for isolating high voltage portions of the die from low voltage portions. The result is that a minimum number of off-chip capacitors are required for implementation and a minimum number of I/O pads are used to make the off-chip connections. By using chip capacitors, the die and the capacitors can be mounted directly on a substrate (thick or thin film) or, in one preferred embodiment of the present invention, directly on an electroluminescent panel. It will be appreciated by those skilled in the art that the entire exponential voltage multiplication power supply circuit, including capacitors, may be fabricated on a single integrated circuit die limited mainly by the area of the die dedicated to the construction and isolation of the capacitors in the circuit. Those skilled in the art will readily recognize other advantages of the present invention to which the claims of this application are directed.

The theory behind the present exponential voltage multiplication power supply is shown graphically in FIG. 1. For purposes of illustration, all capacitors are the same size, although as will be described in detail below, it may be advantageous to use capacitors of different values. In the hypothetical embodiment shown in FIG. 1, three stages are present, each stage comprising a capacitor C0, C1 or C2 respectively. All capacitors are placed in parallel to a DC voltage source for initial charging (this is called the store state), as shown in FIG. 1(a). It will be recognized by those skilled in the art that capacitors C1 and C2 do not need to be initially charged to the supply voltage for the circuit to operate properly. However, by initial charging, the circuit is given a "leg up" on charging the capacitors to their respective steady state high voltages.

Once capacitor C0 has charged to a steady state voltage equal to the supply voltage (10VDC in this example), the capacitor C0 is switched to be in series with the voltage source so that, as shown in FIG. 1(b), the DC supply and the capacitor produce 20 volts (this is called the stack state for stage 0). At the same time, a second capacitor C1 (which was originally charged to the supply voltage along with C0) has been placed in parallel with the 20 volts supplied by the 10-volt source and the capacitor C0. Thus, when C0 is in the stack state, C1 is charged in the store state. After a steady state has been reached, the circuit will stabilize with the voltage on the right side of the circuit being equal to the voltage on the left side of the circuit, as shown in FIG. 1(c). As a result of the depletion of charge from C0 to C1, capacitor C1 will have 15 volts across it and capacitor C0 will have 5 volts across it. A diode D1 is placed between the capacitors to prevent reverse charging when capacitor C0 is being charged.

At this point, the configuration of FIG. 1(a) may be repeated to recharge C0. After C0 has become fully charged once again to approximately 10 volts, C0 is placed in series with the voltage source in another stack state. Again, this stepped-up voltage of 20 volts is placed in parallel or across C1 as shown in FIG. 1(d) the instant after connection. The charge dumps off of C0 and into C1 resulting in C1 having 17.5 volts across it, as shown in FIG. 1(e). The above process is repeated a sufficient number of times to result in a voltage approaching 20 volts across C1. By varying the size of the capacitors C0 and C1, the time it takes or the number of cycles it takes to charge C1 may be varied.

The preferred embodiment of the present invention uses multiple store states for each stack state of a given capacitor stage. After C1 and C0 are both fully charged, C1 to approximately 20 volts and C0 to 10 volts, they are placed in series with the voltage source. This in turn is placed in parallel with C2, as shown in FIG. 1(f) which also had been initially charged to the supply voltage. The charge from capacitors C0 and C1 is dumped into C2, resulting in C2 charging to 20 volts at steady state shown in FIG. 1(g). The above steps are then repeated a sufficient number of times to bring the charge across C2 to 40 volts as shown in FIG. 1(h). Thus, it can be seen that each stage provides for doubling of the voltage.

In one preferred embodiment for the application of this supply to EL panels, there are six stages resulting in a multiplication of the voltage by approximately 64 times ($2^6$). Those skilled in the art will recognize that by placing two capacitors in parallel in each stage for the store (charge) state and switching the two capacitors in series for a stack (step) state within each stage, the voltage may be tripled by each stage. In this way, a $3^n$ exponential voltage multiplier may be obtained. Fractional exponents may also be obtained by limiting the number of store states and by changing the stacking configurations so that just about any positive or negative voltage is obtainable.

Figure 2:
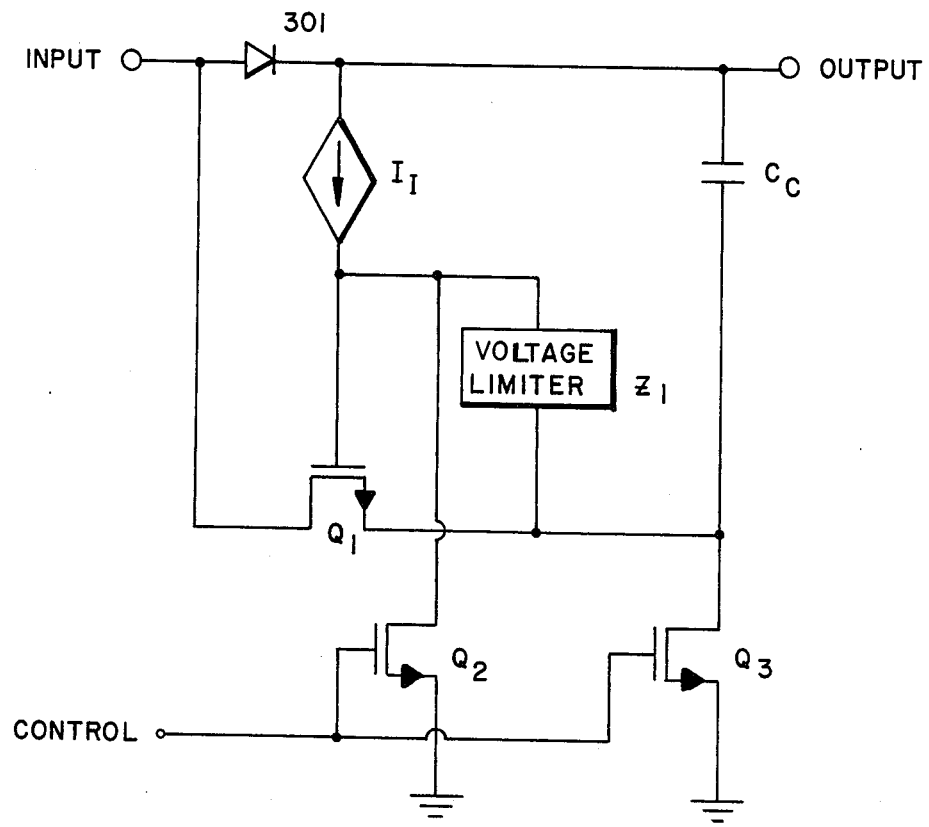
FIG. 2 depicts the model implementation of a single stage in the exponential multiplication power supply.

FIG. 2 depicts one method by which one stage or cell of the DC exponential multiplier power supply may be implemented. When the control line shown is HIGH (i.e., above the gate turn-on threshold voltage of $Q_2$ and $Q_3$), the cell is in the store state. With $Q_2$ and $Q_3$ both ON, $Q_1$ is OFF. Capacitor $C_c$ charges toward the input voltage through diode 301, FIG. 2. When $Q_3$ and $Q_2$ are both OFF, $Q_1$ turns ON as the gate to source capacitance of $Q_1$ charges through $I_1$. When $Q_1$ is turned ON, $C_c$ is placed in series with the input voltage, resulting in Vout=2 Vin.

If voltage limiter $Z_1$ was not in place, the gate of $Q_1$ would charge to the voltage across $C_c$; since this can be large enough to damage $Q_1$, a voltage limiter such as a zener diode is employed.

The current source $I_1$ is used to limit the amount of current bled off $C_c$. A dependent current source can be used as $I_1$ to minimize the amount of charge lost from $C_c$. This current source would be switched off during the store and stack states. $I_1$ would only be switched on long enough to charge the gate capacitance of $Q_1$ during the transition to the stack state. Another approach is to use a resistor in place of $I_1$. This would work as long as $C_c$ stays charged to near its maximum value.

Application of the Exponential Voltage Multiplier to EL Panels

Figure 3:
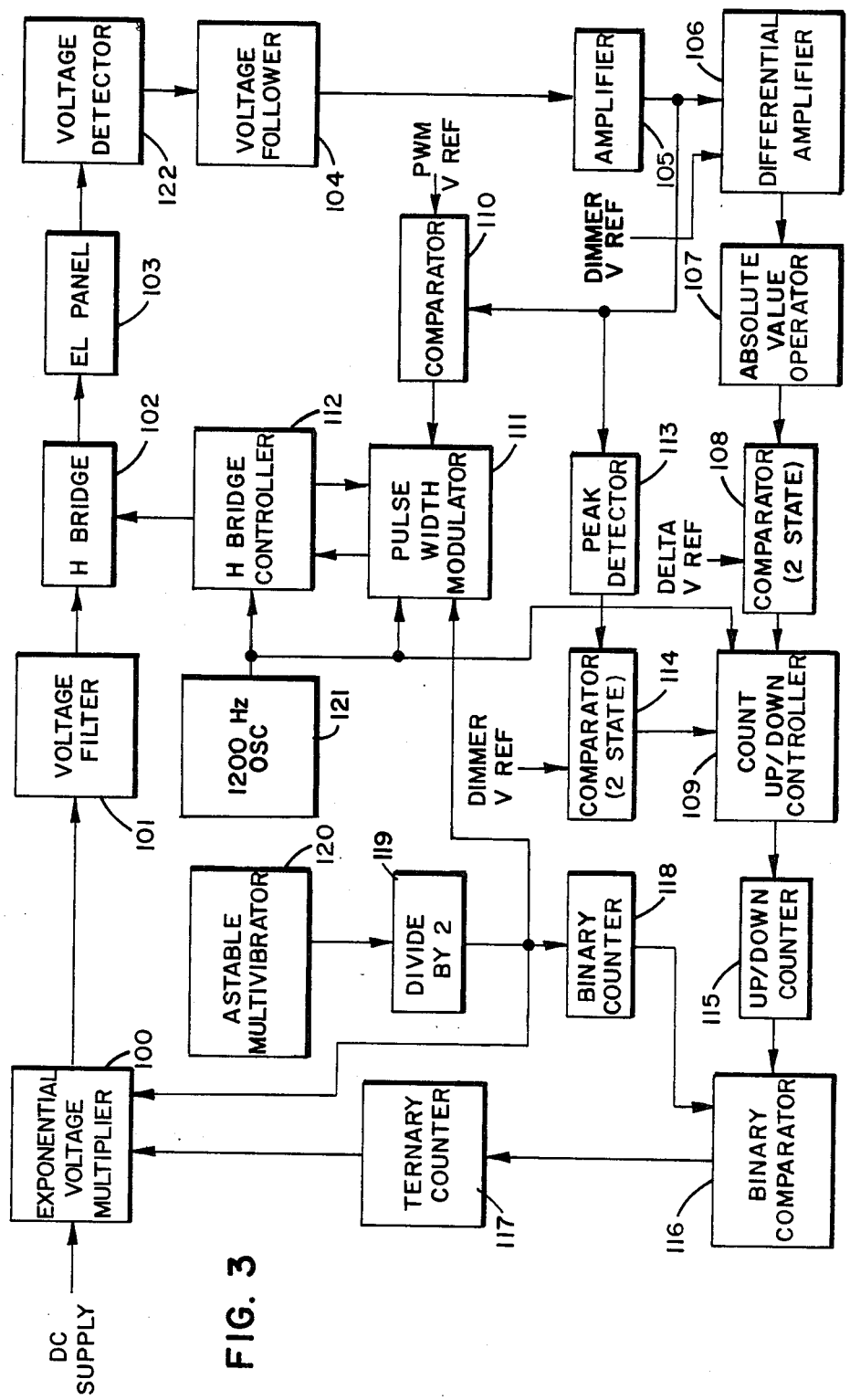
FIG. 3 is a block diagram of a compensated exponential multiplication power supply attached for driving an electroluminescent panel.

The operation of the present compensated exponential voltage multiplier power supply for exciting an electroluminescent panel can best be understood by beginning with a general description of the organization of the preferred embodiment of the present invention. Referring to FIG. 3, the DC exponential multiplication circuit 100 is a six-stage switched capacitor network comprising an input stage and subsequent stages 1-5 which theoretically multiplies a supply voltage selected to be 13.6 volts DC by $2^6$ to a maximum output voltage of 870.4 volts DC. The actual output voltage depends upon the number of store states for each stack state, the output load and the frequency of switching of the states. For example, the preferred embodiment of the present invention is designed to operate from an automobile battery voltage of 13.6 volts DC nominal. Since stage 1 of the multiplier circuit is only charged twice before stacking, the output voltage of stage 1 only reaches 23.8 volts DC upon initial power-up instead of the theoretical maximum of 27.2 volts DC. After a number of cycles of state, stage 1 can reach the maximum of 27.2 volts DC depending upon loading conditions. Each stage is similarly affected. Other losses inherent in the design and use of real components rather than ideal models contribute to the less than ideal output voltage.

In the preferred embodiment shown in FIG. 3, a ternary counter 117 controls when stages 1-5 of the multiplier 100 are charging (store state) and when each stage is stepping (stack state) in the DC exponential multiplication power supply to stack the stages to grow the resultant voltage exponentially and to control the magnitude of the resulting voltage. It will be understood by those skilled in the art that the use of the term ternary in this context refers to a 3-state sequence device which is implemented in binary digital logic. The ternary counter 117 produces a repeating sequence such that each stage in the preferred form of the present invention is placed in a store state twice for every stack state (hence the 3-state sequence). It will be appreciated by those skilled in the art that a quaternary (4-state sequence) counter may be substituted for ternary counter 117 to provide an extra store state which would result in an even higher output voltage from each stage depending on the load. Any n-state counter could be substituted for counter 117 without deviating from the spirit and scope of the present invention.

As shown in FIG. 3, the high voltage output from the DC exponential multiplier circuit 100 is fed into voltage filter 101. The voltage filter serves the purpose of providing a relatively constant high voltage to voltage switcher 102 (H-bridge) which switches the high voltage across EL panel 103. The H-bridge 102 of FIG. 3 alternates in the preferred embodiment between applying zero voltage, applying a positive high voltage pulse and applying a negative high voltage pulse across EL panel 103. The H-bridge controller 112 controls the changeable width of the pulse that the H-bridge applies to the EL panel, and in an alternate embodiment described below, controller 112 also controls the changeable frequency of the pulses across EL panel 103. The EL panel 103 luminesces as a result of the rapidly changing voltage applied to it.

The voltage detector 122 converts the output current through the EL panel into an output voltage to form the first leg of a feedback path to detect changing characteristics of the EL panel 103. Although a voltage detector is used in the preferred embodiment, an optical detector is also described below as an alternate means of sensing changing conditions. The voltage detector 122 feeds into voltage follower 104, which acts as a voltage buffer. The voltage follower in turn feeds into amplifier 105 of FIG. 3.

The output of amplifier 105 is used in several ways. First, it is fed into differential amplifier 106 which in turn feeds absolute value operator 107. The output of the absolute value operator is compared to a fixed reference voltage (DELTA VREF) by comparator 108. This comparison function prevents the control circuitry in the preferred embodiment of the present invention from changing the output voltage of the DC exponential multiplication power supply for arbitrarily small changes in the current through the EL panel. The output of the two-state (binary) comparator 108 is fed into controller 109 that controls the count up or down function of UP/DOWN counter 115 depending upon the sign and the magnitude of the current through the EL panel.

Second, the output of amplifier 105 is fed into comparator 110 which compares it with the pulse width modulator reference voltage (PWM VREF) to detect changes in the current through the EL panel. The output of comparator 110 drives the pulse width modulator (PWM) 111 which controls the width of the pulses which the H-bridge 102 applies to the EL panel. As the EL panel ages, its capacitance changes (as well as other characteristics), and it is desirous to produce a level of radiation output (light) at a minimum power input. The PWM 111 will allow the duty cycle to be varied based on the current through the EL panel. The narrowing of the pulse width is also used to reduce the postulated aging effect caused by the higher driving potentials that are applied to aged panels (to keep the same light intensity output).

The H-bridge controller 112 is driven by a fixed frequency oscillator 121 which is set in the preferred embodiment to be 1200 Hz which is divided by 3 to apply the 3-state pulse sequence to the H-bridge at 400 Hz. It will be appreciated by those skilled in the art that other frequencies may be selected without deviating from the spirit and scope of the present invention. In the present preferred embodiment, the pulse width is varied in response to changing characteristics of the EL panel while keeping the frequency of application of the pulses to the EL panel fixed at 400 Hz. As described below in an alternate embodiment, the frequency of the pulses as applied by the H-bridge 102 to the EL panel 103 may also be varied in response to changing conditions sensed from the EL panel.

A variation on the clocking structure of the H-bridge shown in FIG. 3 is to derive the clocking signal for the H-bridge 102 from the astable multivibrator 120 rather than using a separate 1200 Hz oscillator. A binary counter can be used to divide down the high frequency of the astable multivibrator to a lower frequency usable by the H-bridge controller 112. Those skilled in the art will readily recognize additional alternate means of clocking the control logic.

The third use of the output of amplifier 105 is to feed it into a peak detector 113 which in turn is compared with a variable reference voltage (DIMMER VREF) by comparator 114. The value of the signal DIMMER VREF controls the brightness of the EL panel and, when used for dashboard lighting in an automobile, is supplied from a dashboard dimmer control knob. It will be appreciated by those skilled in the art that the variable reference voltage DIMMER VREF may be placed at a fixed value so that the light emitted from EL panel 103 is preset to a fixed value which cannot be changed by the user.

In an alternate embodiment of the present invention, the DIMMER VREF variable reference voltage may be used to preset or preselect the light intensity emitted from EL panel 103 to "pre-age" the panel to a selected intensity to match the intensity of a panel being replaced in, for example, an automobile. The effect of this "pre-aging" to select the intensity is to match the intensity level output of aged EL panels adjacent the panel being replaced in an automobile such that all panels glow with the same intensity and the replacement panel does not stand out from the unreplaced panels.

The output of comparator 114 is fed into the count up/down controller 109. This is the same controller that the output of comparator 108 is connected for responding to voltage changes across the EL panel 103. The output of the count up/down controller 109 is fed into counter 115. The output of the up/down counter 115 is then fed into a binary comparator 116, which in turn controls the speed at which ternary counter 117 drives the exponential voltage multiplier 100. The faster the multiplier 100 is driven, the higher the effective output voltage for a given load.

A free-running astable multivibrator 120 operates in the preferred embodiment as an oscillator and feeds a divide-by-two circuit 119 which operates to square up the pulse chain and produce a 50% duty cycle square wave. The output of divide-by-two circuit 119 is fed into a binary counter 118 which further divides the frequency by a pre-selected amount. The binary counter output is then fed into the binary comparator 116 which compares the counted value of the binary counter 118 with the output (an error count defined as CTRIG below) of counter 115. The output of the binary comparator serves as a clock for the ternary counter which in turn is used to determine what switches are open and closed in the DC exponential voltage multiplier 100. The speed of clocking of the ternary counter 117 determines the magnitude of the voltage which is produced and applied to the EL panel.

The magnitude of the output voltage of the exponential voltage multiplier 100 is a function of the speed of clocking of the stages, the ratio of store states to stack states, capacitor ratios, component losses, input voltage and the load connected to its output. The amount of current that the exponential voltage multiplier can source to a fixed load will determine the voltage on the output or the voltage across the load. For a given load, the fixed amount of current passing through exponential voltage multiplier 100 will produce a fixed voltage. In order to increase the voltage across the load, an increased amount of current must be transferred through the exponential voltage multiplier. Since the exponential voltage multiplier circuit operates as a series of stages which stack voltages to charge capacitors, the analogy to a "bucket brigade" is appropriate to describe how an increased amount of current can be transferred to the output by increasing the speed of operation or the speed of clocking of the exponential voltage multiplier. Other factors that would affect the amount of current that can be passed include the size of the capacitors which are charged within each stage and the speed of operation of the actual switches within the stages. In the preferred embodiment of the present invention, a ternary counter 117 is used to drive exponential voltage multiplier 100 at a variable frequency. The counting sequence implies that each stage is charged twice before it is stacked. This 3-stage limitation implies that each capacitor of each stage is charged less than its theoretical maximum value than if more store states were used. By increasing the speed of clocking from ternary counter 117, however, the output voltage of the exponential voltage multiplier into a fixed load can be increased by transferring a larger amount of current given the control of each stage.

In the preferred embodiment of the present invention a 6-stage exponential voltage multiplier is used to step up the 13.6 volt DC battery voltage found in automobile applications to a higher voltage of approximately 600 volts DC for application across the EL panel 103. The actual voltage out of the exponential voltage multiplier 100 may range from approximately 500–800 volts DC, which is mainly dependent on the loading conditions imposed by the EL panel 103. A wide variety of shapes and sizes of EL panels yield different impedance characteristics which affect the output voltage available from the exponential voltage multiplier.

Figure 4:
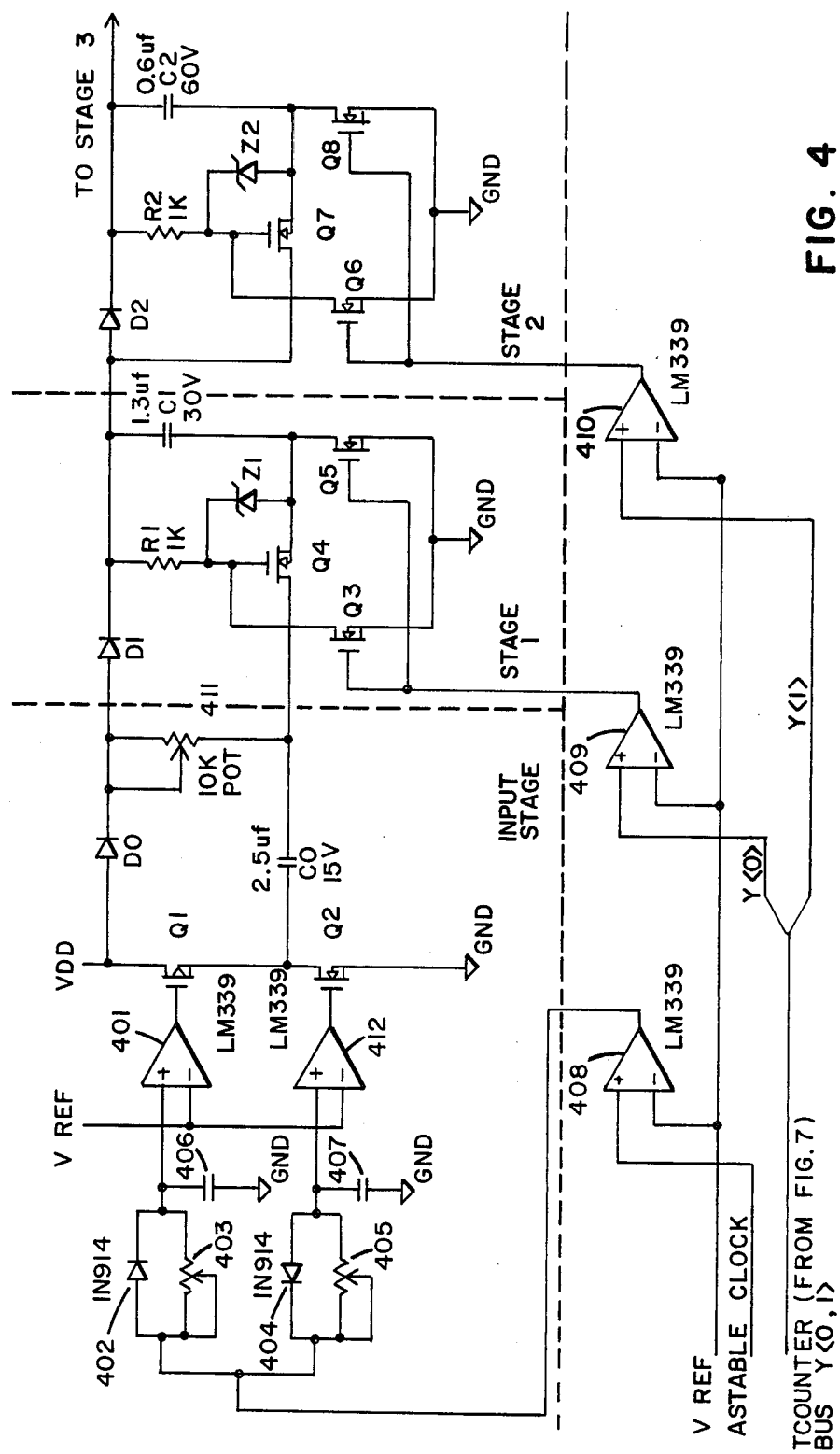
FIGS. 4-9 form a detailed electrical schematic diagram of the compensated exponential multiplication power supply attached to an electroluminescent panel.
Figure 5:
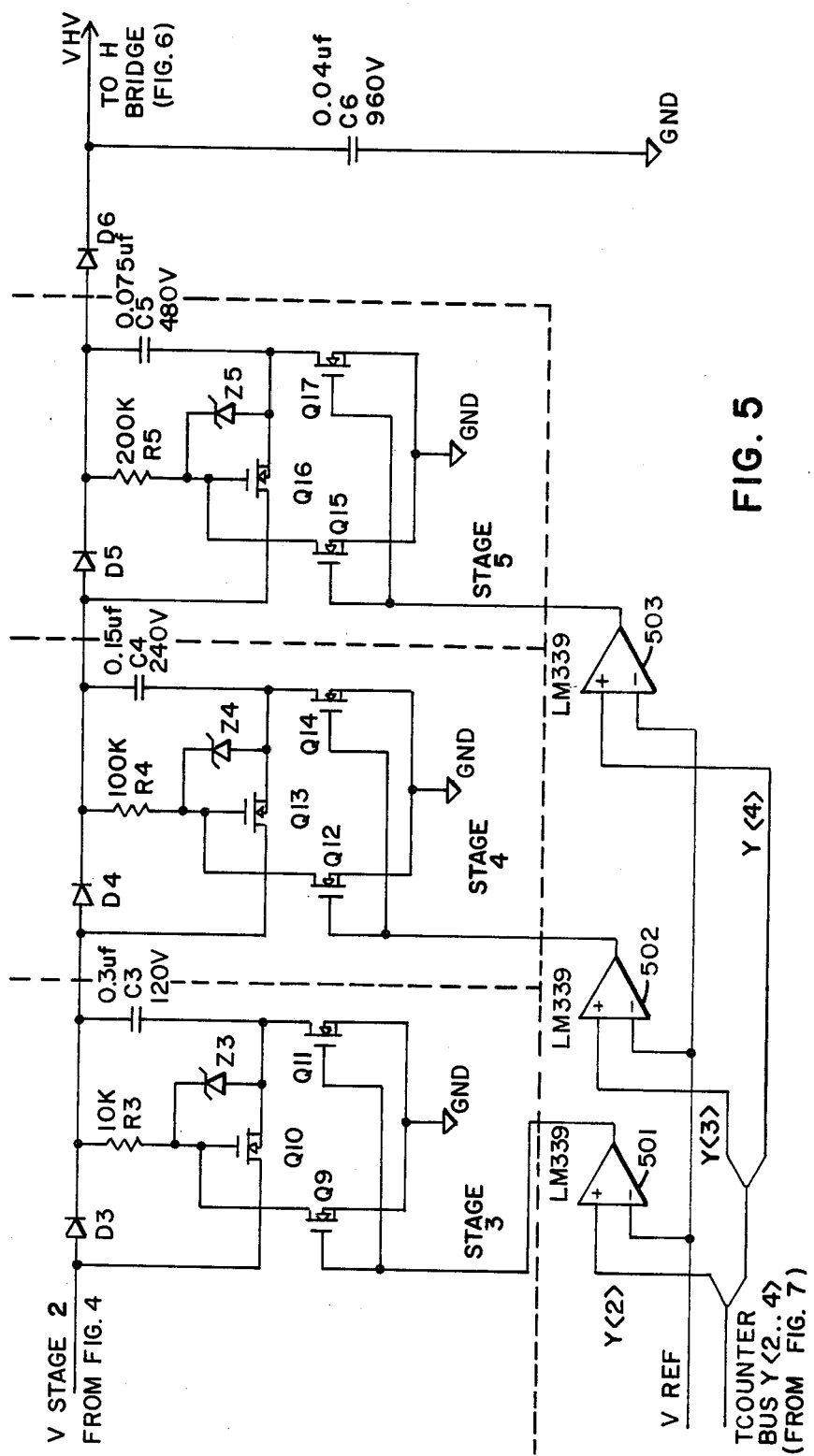

The exponential voltage multiplier 100 in the preferred embodiment is shown in FIGS. 4 and 5 to be arranged as a series of six stages, comprised of an input stage followed by five other stages (labeled STAGE 1–5). Each of the stages other than the input stage is clocked by the ternary counter 117 such that each stage is controlled to charge in a store state twice before being stacked for producing a higher voltage. The input stage will be controlled to repeat a sequence of charge-stack (CS). Since the input stage is driven by a high current source, only one charge state is needed to charge the capacitor of the input stage to a full charge having a voltage equal to the supply voltage. After a single charge state, the input stage can be stacked with the supply for charging the first stage.

The first stage (STAGE 1 described below) is controlled by the ternary counter to follow the sequence charge-charge-stack (CCS). However, for each charge state of the first stage, the input stage must complete at least one full CS cycle for each C cycle of the first stage. If the stacked voltage on the input stage is greater than the voltage stored in the capacitor of stage 1, each stack state of the input stage will cause the capacitor of stage 1 to be charged in the store stage. If the voltage on the capacitor in.. stage 1 is already at a voltage greater than or equal to the stacking voltage of the input stage, stage 1 will be in a hold state. Thus, for steady state operation of the voltage multiplication series, each CS cycle of input stage will be synchronized with a hold-charge (HC) cycle of stage 1. In continuous operation, a CSCSCS sequence from input stage will be synchronized with an HCHCHS sequence of stage 1.

The second stage (stage 2 described below) is also controlled in the preferred embodiment by the ternary counter to follow a CCS sequence, however each charge state of the second stage requires a full CCS cycle of the first stage. During steady state operation, while the first stage is in a charge state the second stage is in a hold state waiting for the voltage on the first stage to be charged to a sufficient level to allow it to be stacked with the input stage and the supply voltage to produce a higher charging voltage for the second stage. Hence, the second stage is in a hold-hold-charge (HHC) sequence while the first stage is in a CCS sequence. Synchronizing this operation between the input stage, stage 1 and stage 2, a CSCSCS CSCSCS CSCSCS sequence of operation of the input stage will be synchronized with an HCHCHS HCHCHS HCHCHS sequence of the first stage, which is in turn synchronized with the HHHHHC HHHHHC HHHHHS sequence of the second stage.

The following stages 3 through 5 in the six-stage exponential voltage multiplication circuit 100 of the preferred embodiment follows a similar relationship to the previous stages. During steady state operation, the last stage is holding for quite a long period of time waiting for the previous stages to multiply the voltage up to a higher order for charging of the last stage.

It will be appreciated by those skilled in the art upon understanding the preferred embodiment of the present invention that on initial power-up, all of the stages are charging when the earlier stages are stacking. Thus, in the first charge state of the input stage, all the capacitors in the series are initially charged to the supply voltage of about 13.6. Thus, the initial state for the disclosed exponential voltage multiplier upon power-up is a charge state for all stages. It is therefore appropriate to describe each stage as having two states, a store state and a stack state, where the store state is actually comprised of two substates, the charge sub-state and the hold sub-state. It will be appreciated by those skilled in the art that the actual switching between the charge sub-state and the hold sub-state may be accomplished automatically as an inherent function of the design, as implemented in the preferred embodiment of the present invention, or that the hold sub-state may be actively controlled by the control circuitry of the present invention as a separate hold state.

It will also be appreciated by those skilled in the art that many variations on the clocking structure for controlling the exponential voltage multiplier 100 are possible without deviating from the spirit and scope of the present invention. For example, referring to FIG. 3, the input stage of the exponential voltage multiplier is clocked directly by the divide-by-two counter 119 of the astable multivibrator 120. Binary counter 118 serves to divide down this frequency to a lower frequency for ultimately driving the ternary counter 117 at a lower rate. Thus, the astable multivibrator 120 in conjunction with the counter 119 as described in the preferred embodiment of the present invention and as shown in FIG. 3 tends to operate the input stage at a much higher frequency than the subsequent stages in the series. It can easily be seen that the input stage could be clocked by the divided-down value of the binary counter 118 or the output of the binary counter 116 to synchronize more carefully the input stage to the subsequent stages in the series.

It will also be appreciated by those skilled in the art that the input stage could be directly controlled by the output of the ternary counter to present a simple CS sequence for the input stage. In this alternate embodiment, the clocking frequency of the input stage would be variable in the same fashion that the clocking frequencies of the subsequent stages of the series are variable in response to changing conditions on the EL panel 103. Many other variants of the clocking sequence and the clocking structure will be readily apparent to those skilled in the art upon reading and understanding the present specification, and these variants and variations are intended to be covered by the claims of the present invention.

Electrical Schematic Description of the Compensated Exciter for EL Panels

Figure 8:
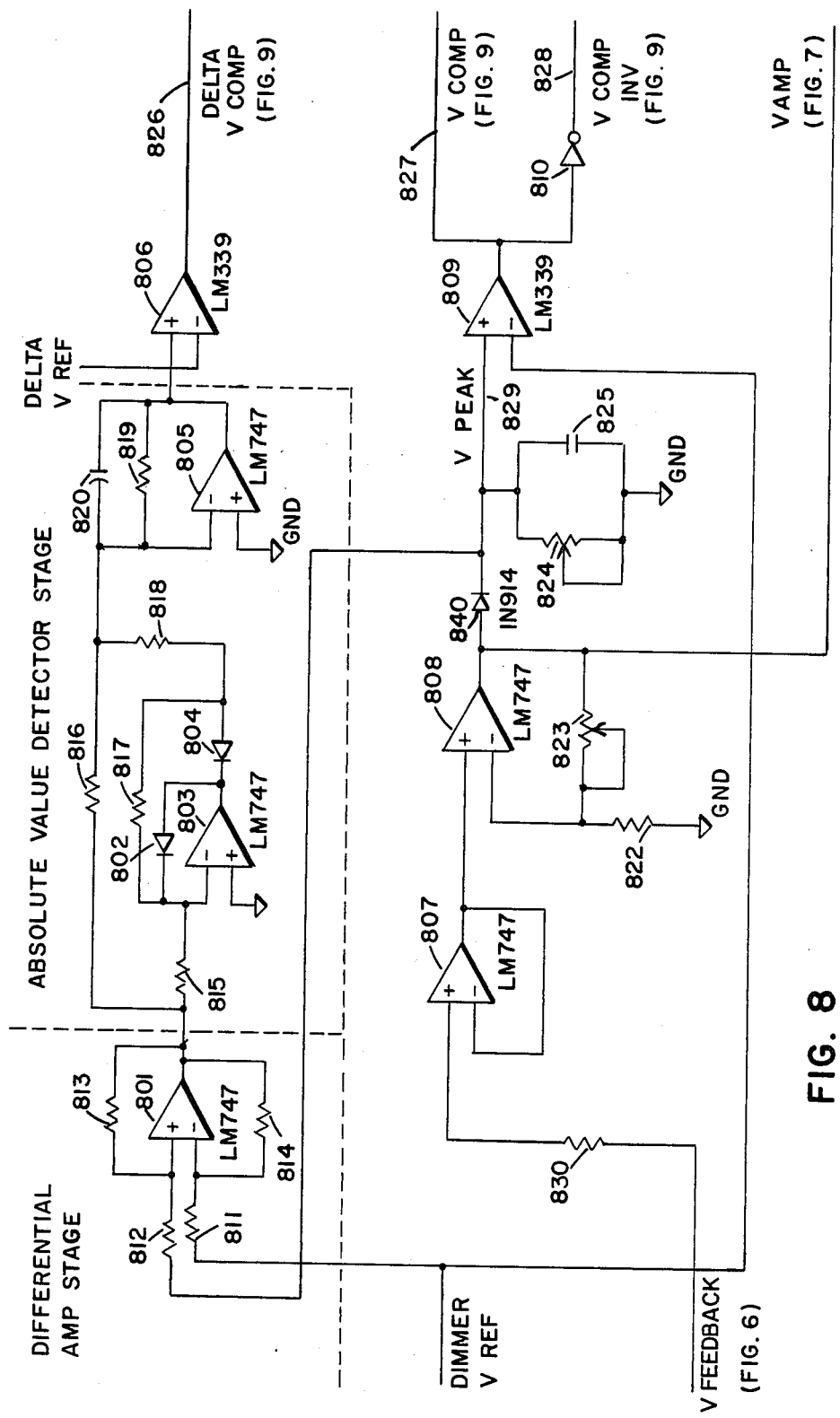
Figure 9:
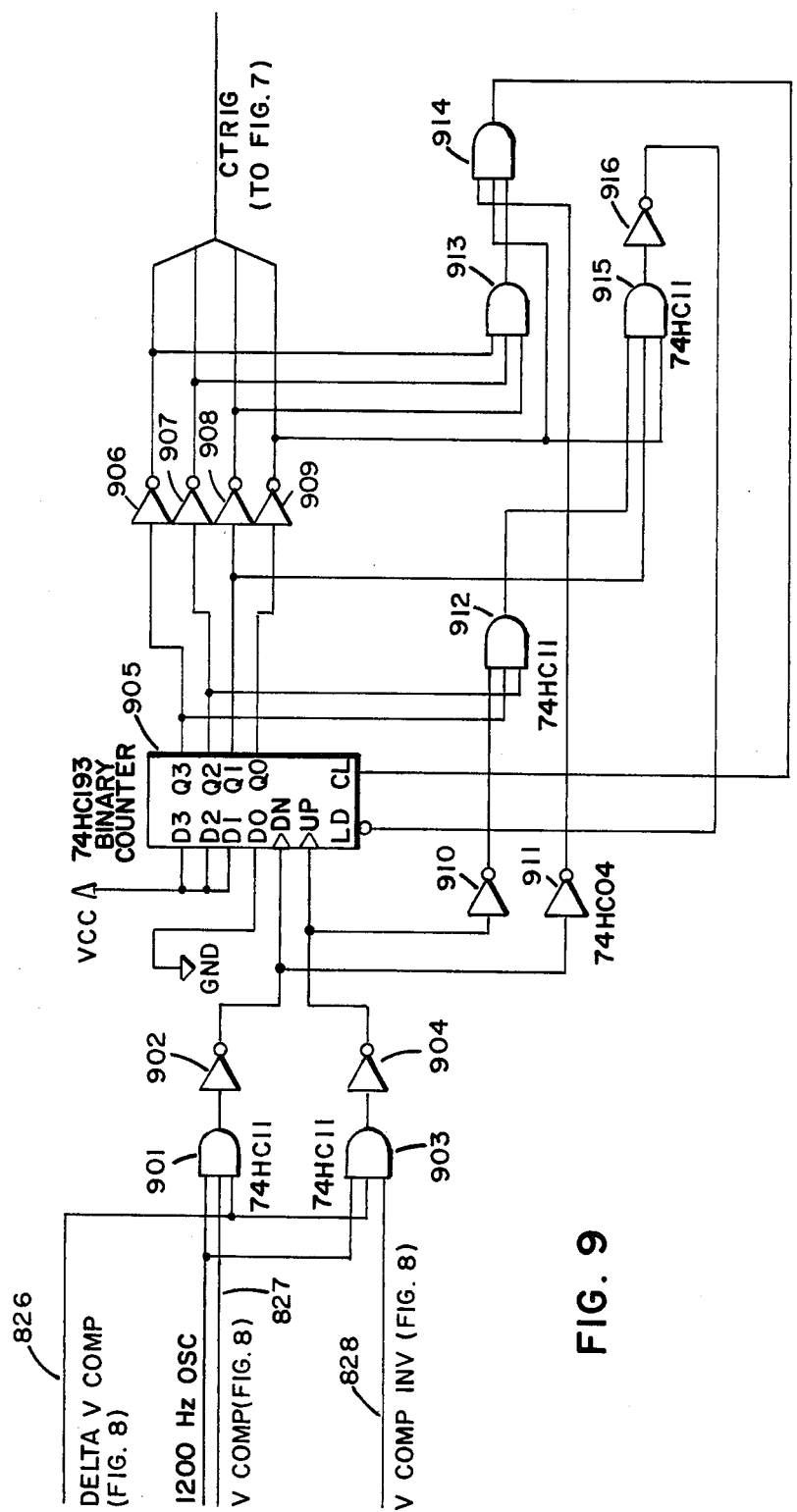
Figure 10:
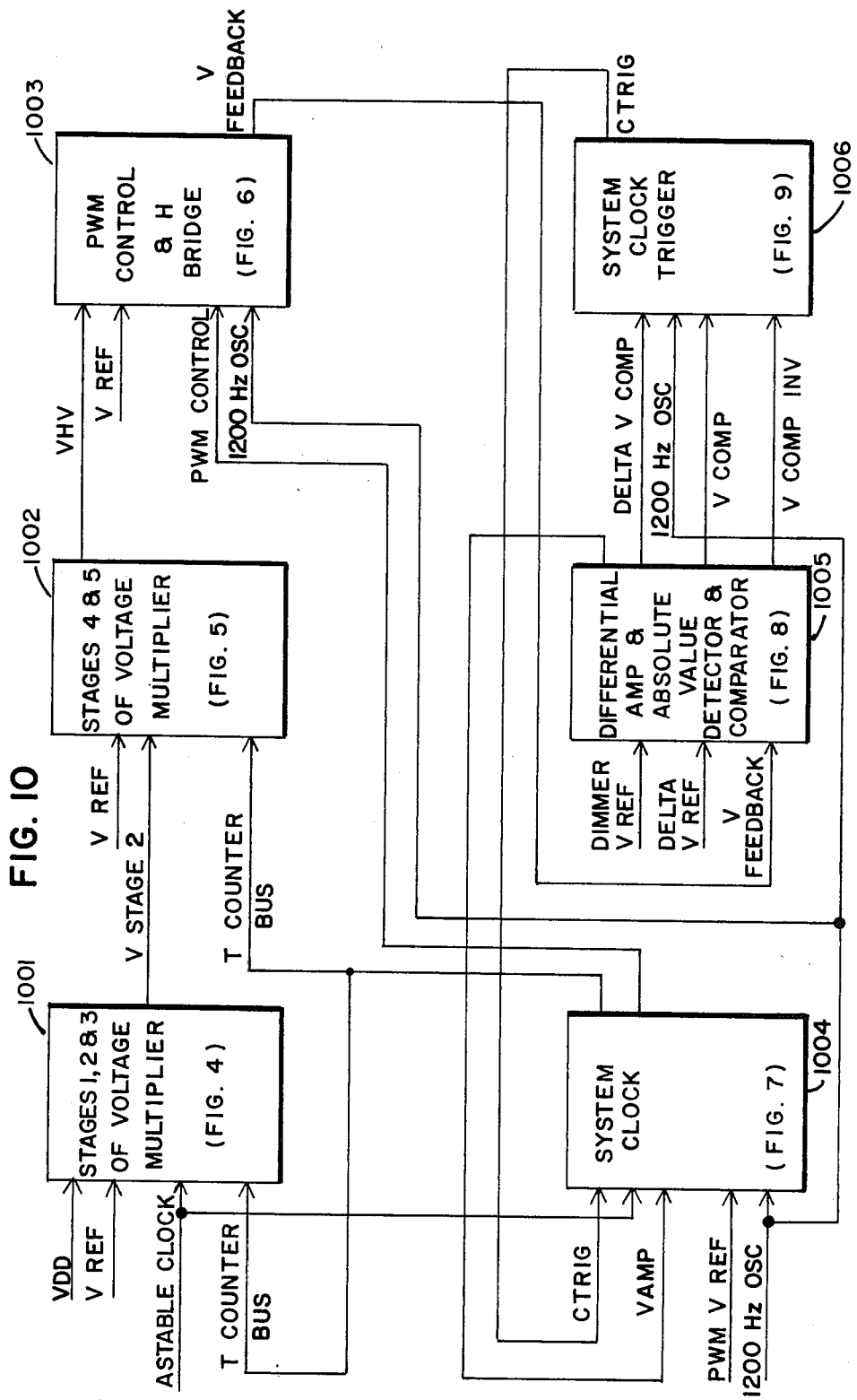
FIG. 10 is a map illustrating the power and control connections between FIGS. 4-9.

The detailed schematic description of the preferred embodiment of the present invention is shown in FIGS. 4-9 with a map of the inter-figure connections shown in FIG. 10. The exponential voltage multiplier 100 shown in FIGS. 4 and 5 converts an available DC voltage, 13.6 volts for example, to high voltage—theoretically $VHV = V_{DD} \times 2^6$ where VHV represents the high voltage developed across capacitor C6 and $V_{DD}$ represents the available DC voltage. This open-circuit output voltage is actually lower than the theoretical maximum due to the losses in the capacitors C0–C5 and the power metal oxide semiconductor field effect transistors (MOSFETs) Q1–Q17 used as switches. The actual output voltage is much lower than the theoretical maximum when driving a load. The actual output voltage depends upon the load value, the speed of switching the stages, the size of the capacitors, etc. This actual output voltage is used to excite the electroluminescent panel.

The preferred embodiment of the present invention is best implemented using solid state components and design techniques. In one preferred implementation, the entire power supply circuit, less the capacitors, is fabricated on a single integrated circuit using available techniques to isolate the high voltage power MOSFETS in their own wells to avoid overvoltage damage to the low-voltage logic. Another preferred implementation is to use standard off-the-shelf parts as is described here. Those skilled in the art will readily recognize that the conversion between the preferred implementations is a simple technique and well within the skill of the ordinary artisan.

Referring to FIG. 4, the DC potential $V_{DD}$ is applied to the source of Q1 and the anode of D0. Initially, capacitors C1, C2, C3, C4, C5 and C6 will be charged by $V_{DD}$ through diodes D0, D1, D2, D3, D4, D5 and D6. This places about $V_{DD}-0.6$ volts (0.6 being approximately one diode drop) at the drain of Q4 through the 10K potentiometer 411. The 10K pot 411 is not necessary to implement the circuit in the preferred embodiment, but is helpful in limiting in-rush current. When fabricating the circuit using integration techniques, those skilled in the art will understand that the 10K pot 411 may be replaced with a short circuit or a fixed resistance.

The input stage ($S_0$) of the six-stage exponential voltage multiplier charges capacitor C0 to the supply voltage $V_{DD}$ in the store state and stacks capacitor C0 with the supply voltage in the stack state. Stage 0 thus only has a two-state charge-stack sequence of operation. The control signal for operating stage 0 is derived from the output of comparator 408 which in the preferred embodiment of the present invention is an LM339 comparator available from National Semiconductor and other vendors. Comparator 408 as well as comparators 409, 410, 501, 502 and 503 are all used in the preferred embodiment of the present invention as signal buffers and level shifters to condition the control lines for each of the respective stages of the exponential voltage multiplier series. An internally derived reference voltage VREF (the derivation of which is not shown) is internally fixed to a threshold level for each of the aforementioned comparators shown in FIGS. 4 and 5. The comparison of VREF by the comparators to the control signals ensures a clean switching signal of the appropriate voltage level for driving the MOSFET switches in the series of stages.

Comparator 408 is shown driven directly from an astable clock which can be derived using conventional methods. In the preferred embodiment of the present invention, an astable clock is implemented using a comparator with an RC timing circuit as its input control to produce a pulse train of a frequency proportional to the values of the resistor and capacitor in the RC network. In this embodiment, the astable clock frequency is selected to be between 150–250 kHz. The output the comparator is used to drive a flip-flop as a divide-by-two counter to produce a 50% duty cycle pulse train for driving comparator 408 and also for driving in synchronism the binary counter of FIG. 7. Although the detailed electrical schematic description of the implementation of the astable clock circuitry is not described, it will be readily appreciated by those skilled in the art that the implementation is well within the skill of the ordinary artisan, and such astable clocks are amply documented in a wide variety of trade literature.

Q1 (a p-channel metal oxide semiconductor device) and Q2 (an n-channel metal oxide semidconductor device) of the input stage may comprise a Complementary Metal Oxide Semiconductor (CMOS) switch, one transistor being ON only while the other is OFF. Driving the CMOS switch is the control signal provided by comparator 408. Two other LM339 comparators 401, 412 and the accompanying diodes 402, 404, capacitors 406, 407, and resistors (potentiometers) 403, 405 process the control signal from comparator 408 to provide a dead time when neither Q1 or Q2 are ON, insuring that unneccesary current will not be flowing through both Q1 and Q2 channels, dissipating power unnecessarily. Dead time for Q1 is established by the RC combination of variable resistor 403 and capacitor 406. The dead time for Q2 is established by the RC combination of variable resistor 405 and capacitor 407. Thus, the turning ON and OFF of Q1 and Q2 are controlled by comparator 408 which establishes the charge-stack 2-state sequence of control of stage 0. Those skilled in the art will recognize that trimmer pots 403 and 405 are replaced with resistors when implementing the preferred embodiment using integration techniques.

When the control signal from the output of comparator 408 is HIGH, Q2 is ON, grounding the drain of Q2 and the source of Q1 (which is held OFF). The potential across C0 is then about $V_{DD}-0.6$ volts (assuming potentiometer 411 is set for maximum current or a dead short). When the output of comparator 408 is switched LOW, Q2 switches OFF. After a dead time set by the RC combination of resistor 403 and capacitor 406 which insures that Q2 is OFF, Q1 turns ON, bringing the previous grounded end of C0 to about $V_{DD}$. Since the potential across the capacitor cannot change instantaneously, the potential at the anode of D1 and the drain of Q4 is now stepped to about $2V_{DD}$.

The potential at the cathode of D1 is also about $2V_{DD}$. This potential charges the capacitor C1 of stage 1 through diode D1 when Q4 is OFF (stage 1 being in the store state). Through diodes D2, D3, D4, D5 and D6 the capacitors C2, C3, C4, C5 and C6 in the remaining stages respectively are charged to the same potential as C1. The potential at the drain of Q4 serves to either charge capacitor C1 with the stacked voltage from stage 0 when Q4 is OFF or stack the voltage on capacitor C1 with the stacked voltage from stage 0 when Q4 is ON. Thus, by the switching of Q4 the capacitor C1 is either charged by the previous stage (when stage 1 is in the store state) or stepped up in voltage to charge the later stage (when stage 1 is in the stack state).

In the preferred embodiment, the output of comparator 409 serves to control stage 1 to place it either into a stack state or a store state. The inverting input of comparator 409 receives the reference voltage VREF in the same fashion as the other control comparators of each stage and is used for the reasons discussed above. The noninverting input of comparator 409 is attached to line Y(0) of the five-line TCOUNTER bus, as shown in FIG. 4. The signal Y(0) is synchronized and coordinated with the other four control signals of the six-stage exponential voltage multiplier series such that the stack states and store states of the five last stages are coordinated to perform the exponential multiplication of the voltage $V_{DD}$.

When the output of comparator 409 of FIG. 4 is LOW (indicating stage 1 being in the stack state), Q3 and Q5 are OFF, allowing the gate of Q4 to be pulled HIGH through pull-up resistor R1 and turning on Q4. This connects the anode of D1 (through resistor 411) to the source of Q4. The gate to source voltage of Q4 is limited by the zener diode Z1 to prevent punch-through of the $SiO_2$ film on the MOSFET gate. The charge required to turn Q4 ON is supplied through resistor R1. When Q4 is ON, the potential at the drain of Q4 is placed in series with the potential of capacitor C1, forming the stack state for stage 1 in combination and coordination with the stack state of input stage.

When the output of comparator 409 is HIGH (indicating stage 1 being in the store state), Q3 and Q5 are ON, grounding the gate of Q4 through Q3 and the source of Q4 through Q5 and therefore Q4 is turned OFF. The potential at the anode of D1 is applied to C1 to charge the capacitor. This charges the capacitor in the store state. Through the switching of the output of comparator 409, the potential at the anode of D2 can be is driven up to about twice the potential at the anode of D1 under no-load conditions.

All the subsequent stages in the network operate in a similar fashion to stage 1. The store state in each stage is where the step transistor Q4, Q7, Q10, Q13 or Q16 of FIGS. 4 and 5 is OFF, forcing the charge to be placed in the associated capacitor C1, C2, C3, C4, C5 respectively through the associated diode D1, D2, D3, D4, D5 respectively. The stack state in each stage is when one of these step transistors on ON. The voltage from the prior stage in the series is placed at what was previously the capacitor ground of the present stage. Since the voltage across the capacitors of the stacked stages cannot change instantaneously, the voltage between ground and the top of the capacitor is seen as approximately twice its previous value by the later stages. The breakdown voltage of each capacitor is shown in FIGS. 4 and 5.

Figure 7:
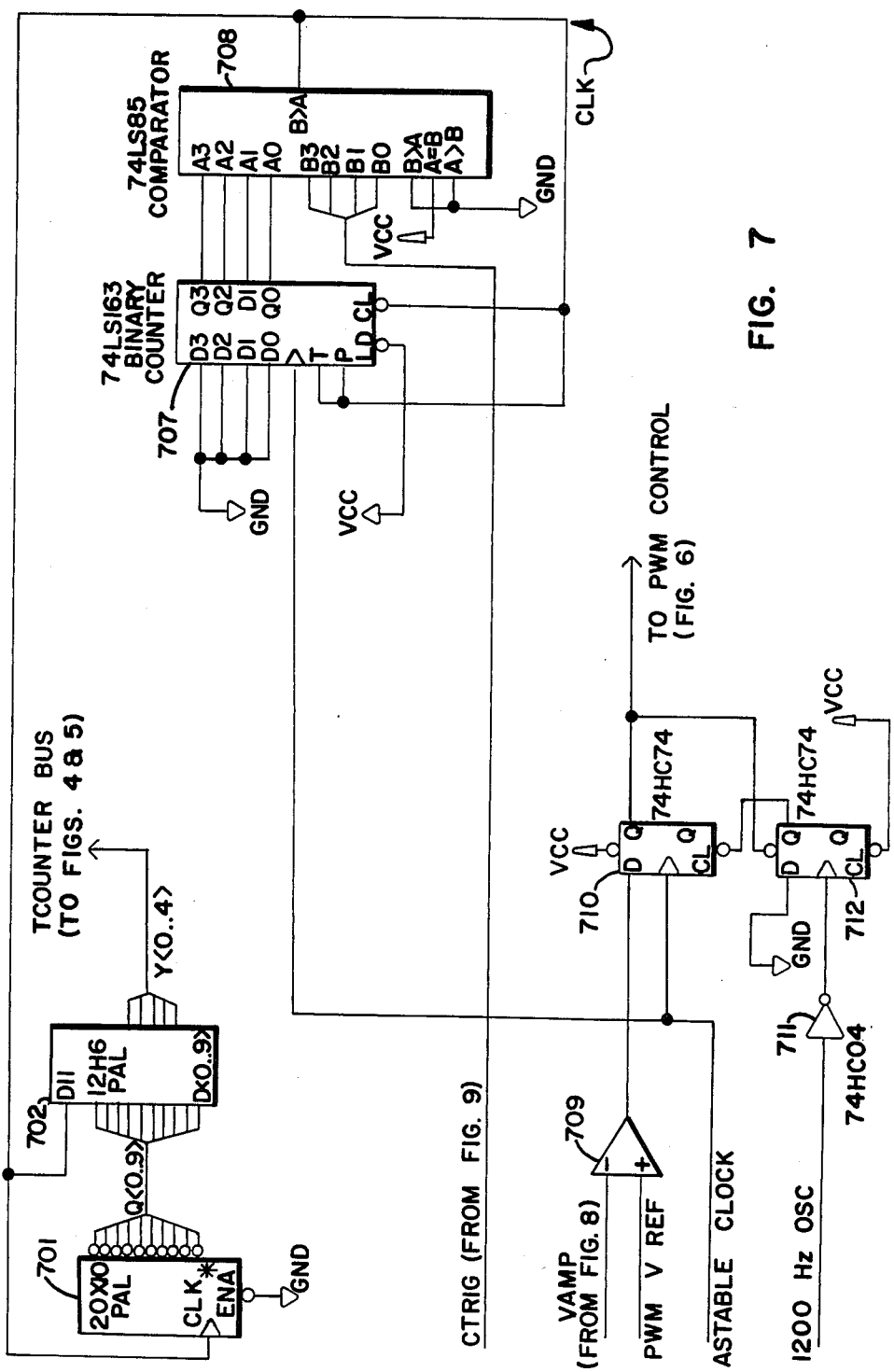

Referring to FIG. 7, the multiplier stages are controlled by the ternary counter 117, which consists of two programmable array logic devices (or PAL®, which is a registered trademark of Monolithic Memories, Inc. of Santa Clara, Calif.) 701, 702 available from Monolithic Memories, Inc., National Semiconductor and other vendors. PAL® 701 is a 20×10 device having 20 inputs crossed with 10 outputs in an exclusive-or function with output registers. PAL® 701 is programmed in a conventional manner as a multi-bit ternary counter, the output of which is the binary equivalent of a base 3 counter. The output of this counter drives PAL® 702 which is a 12H6 device having 12 inputs crossed with six active-high outputs. PAL® 702 is programmed in a conventional manner to determine from the 3-state count of PAL® 701 which stages should be in the store state and which stages should be placed in the stack state. The outputs of PAL® 702 drive the LM339 comparators 409, 410 of FIG. 4 and 501, 502, 503 of FIG. 5. Thus, this PAL® control logic causes each stage of the multiplier to be charged twice in the store state before being placed in a stack state to charge the following stage. For example, stage 1 is charged twice before being stacked with input stage to charge stage 2 (hence the 3-state "charge-charge-stack" or CCS sequence).

The 20×10 PAL® 701 and the 12H6 PAL® 702 of FIG. 7 are programmed in a conventional manner using the guidelines available from the vendor, such as National Semiconductor. It will be appreciated by those skilled in the art that the use of programmable array logic for effecting control functions can be readily substituted therefor with hardwired logic control, microprocessor control with stored programs, other types of programmable logic devices, and the like. It will be understood by those skilled in the art that the control functions mentioned herein are exemplary only and are not intended to limit the scope of the present invention. Those skilled in the art will recognize that alternate control functions do not depart from the spirit and the scope of the present invention.

The logic equations for programming the 20×10 PAL® 701 are as follows:

$D_0 = \overline{Q_1} \oplus Q_0$ $D_1 = Q_0$ $D_2 = \overline{Q_3}Q_1 \oplus Q_2$ $D_3 = [Q_2Q_1 + Q_3\overline{Q_1}] \oplus Q_3$ $D_4 = \overline{Q_5}Q_3Q_1 \oplus Q_4$ $D_5 = [Q_4Q_3Q_1 + Q_5\overline{Q_3Q_1}] \oplus Q_5$ $D_6 = \overline{Q_7}Q_5Q_3Q_1 \oplus Q_6$ $D_7 = [Q_6Q_5Q_3Q_1 + Q_7\overline{Q_5Q_3Q_1}]Q_7$ $D_8 = \overline{Q_9}Q_7Q_5Q_3Q_1 \oplus Q_8$ $D_9 = [Q_8Q_7Q_5Q_3Q_1 + Q_9\overline{Q_7Q_5Q_3Q_1}] \oplus Q_9$ The logic equations for the programming of the 12H6 PAL ® 702 are as follows:

Stage 1 control $= Q_1 \overline{CLK} + Q_0 \overline{CLK}$

Stage 2 control $= Q_2\overline{Q_1}\overline{Q_0} + Q_3\overline{Q_1}\overline{Q_0}$ Stage 3 control $= Q_4\overline{Q_3}\overline{Q_2}\overline{Q_1}\overline{Q_1}\overline{Q_0} + Q_5\overline{Q_3}\overline{Q_2}\overline{Q_1}\overline{Q_0}$ Stage 4 control $= Q_6\overline{Q_5}\overline{Q_4}\overline{Q_3}\overline{Q_2}\overline{Q_3}\overline{Q_2}\overline{Q_1}\overline{Q_0} + Q_7\overline{Q_5}\overline{Q_4}\overline{Q_3}\overline{Q_2}\overline{Q_1}\overline{Q_0}$ Stage 5 control $= Q_8\overline{Q_7}\overline{Q_6}\overline{Q_5}\overline{Q_4}\overline{Q_3}\overline{Q_2}\overline{Q_1}\overline{Q_0} + Q_9\overline{Q_7}\overline{Q_6}\overline{Q_5}\overline{Q_4}\overline{Q_3}\overline{Q_2}\overline{Q_1}\overline{Q_0}$ The manner and teaching of applying the foregoing logic equations to the programming of PAL ® 701 and 702 is described in the Programmable Logic Design Guide Literature, Order No. 3200100-001, available from National Semiconductor, which is hereby incorporated by reference.

Clocking of the input stage, of course, is derived directly from the astable clock and consists of only two states (CS), not three.

This process of switching diodes and capacitors through six stages generates a high DC voltage across the supply capacitor C6 of FIG. 5. The voltage filter 101, consisting of capacitor C6 filters any transients and delivers a smooth high DC voltage to the H-bridge circuit 102 through which the voltage is switched across the EL panel 103. As shown in detail in FIG. 6, the power is delivered to the EL panel 608 through MOSFETS Q18–Q23, zener diodes Z6 and Z7 and resistors R6 and R7, all of which are, arranged in an H-bridge topology.

Figure 6:
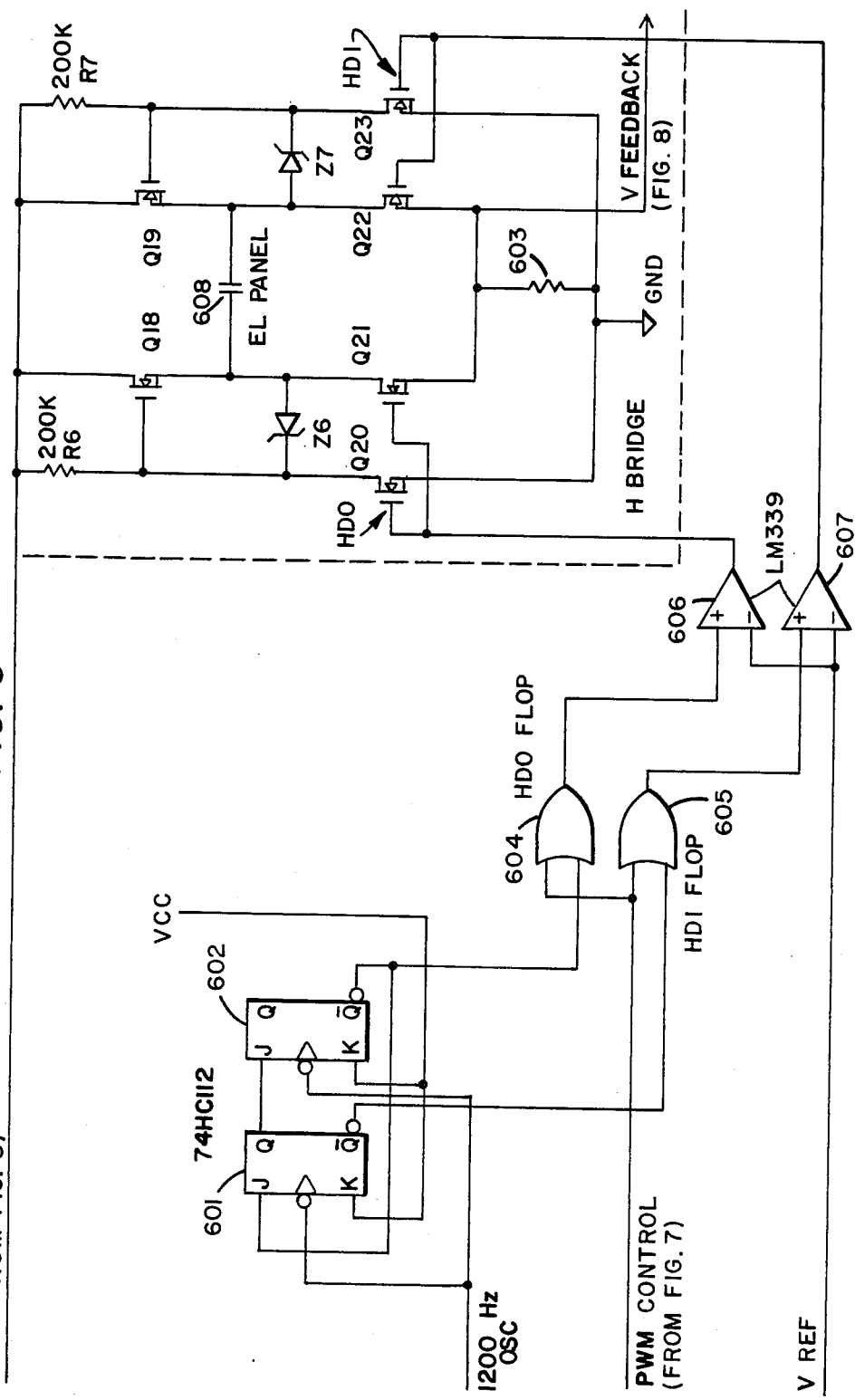
Figure 13:
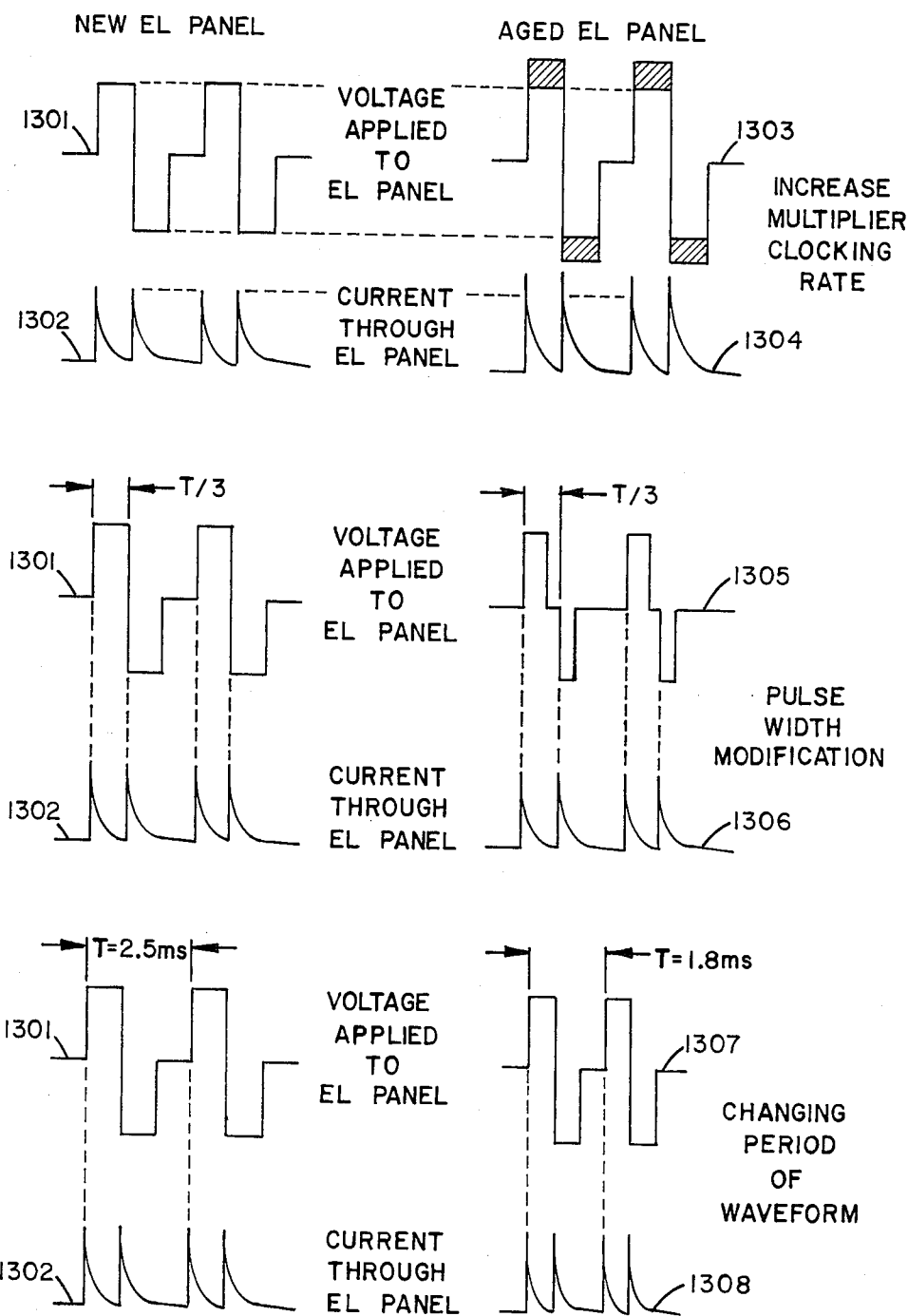
FIG. 13 graphically compares the compensated current and voltage waveforms on a new and an aged electroluminescent panel.

The H-bridge controller (112 of FIG. 3) of the preferred embodiment is comprised of flip-flops 601 and 602, OR gates 604 and 605, and comparators 606 and 607 of FIG. 6 as well as the pulse width modulator control (PWM CONTROL) signal. The HD0 FLOP and HD1 FLOP signals are controlled such that the H-bridge control signals will never be LOW at the same time, although those skilled in the art will recognized that this limitation is arbitrary and that the HD0 and HD1 signals may be at different or same states. Referring briefly to FIG. 13, the waveform 1301 applied to the EL panel 608 is such that over a period HD0 will be LOW for T/3 where T is the period of the H-bridge drive. HD1 will be LOW for the following T/3. The pulse width value of T/3 can be altered by pulse width modulation which will be explained later. The value of T=2.5 ms is selected by the 400 Hz frequency controlling the H-bridge in the preferred embodiment (which is divided down from the 1200 Hz OSC clock 120 of FIG. 3). Those skilled in the art will recognize that other frequencies, pulse widths, periods, etc., may be used advantageously in a variety of applications.

Referring once again to FIG. 6, when HD0 and HD1 are HIGH, Q20, Q21, Q22 and Q23 are ON, grounding both terminals of the EL panel and grounding the gates of Q18 and Q19, causing Q18 and Q19 to be held OFF. This is the relaxation portion of the 3-state waveform placed across the EL panel 608 where no voltage is applied.

When HD0 goes LOW, Q20 and Q21 are turned OFF, allowing the gate of Q18 to be pulled toward VHV through R6. This turns on Q18, causing VHV to be applied to one end of the EL panel 608. Since HD1 is HIGH, current has a complete path to ground through Q22. Zener diode Z7 limits the gate to source voltage of Q19 to safe regions. Thus, current flows through Q18, the EL panel, Q22 and resistor 603 of FIG. 6 to ground. This places a voltage of approximately VHV on the Q18 source side of the EL panel. Thus, the potential across the panel is +VHV. This is the positive pulse portion of the 3-state waveform applied across the EL panel 608.

When HD0 toggles HIGH, HD1 will toggle LOW. Transistors Q20 and Q21 are turned ON grounding the gate and source of Q18 turning it OFF. Transistors Q22 and Q23 are turned OFF. This allows R7 to pull up the gate of Q19, turning it ON. The path of current is now through Q19, EL panel 608, Q21 and through the resistor 603 to ground. Thus, the voltages at the two sides of the EL panel are switched between ground and VHV, and the voltage across the panel varies by twice VHV (from approximately VHV at one polarity to approximately VHV at the opposite polarity). This is the negative pulse portion of the 3-state waveform applied across the EL panel 608.

Compensation Control of the Voltage Applied to the EL Panel

The present power supply includes compensation circuits for correcting for the changing characteristics and reduced radiation output of the EL panel over time. In the preferred embodiment of the present invention, the compensation circuitry can be divided into five functional blocks:
(1) an EL capacitance sensing circuit;
(2) a three-state decoder;
(3) a binary count limiting circuit;
(4) a binary comparator; and
(5) a pulse width modulation circuit.

The circuitry that senses the current through the capacitive EL panel is one preferred form of detecting aging in the EL panel. This capacitance sensing method has the advantage that all sensing can be done on-chip without the need for external off-chip sensors to sense changing characteristics of the panel. As the potential applied to the EL panel is switched, the transient current to the panel is detected by a voltage potential drop across resistor 603 of FIG. 6, at the base of the H-bridge as seen on the signal line V FEEDBACK. This signal is passed through resistor 830 to operational amplifier 807 of FIG. 8 (which in the preferred embodiment is an LM747 op-amp available from National Semiconductor and other vendors) which is connected to operate as a unity gain voltage follower. The signal is then passed to operational amplifier 808 (also an LM747) to impart a small gain to the feedback signal as determined by resistor 822 and potentiometer 823. In the integrated embodiment of the present invention, trimmer pot 823 would be replaced with a fixed resistor, thereby fixing the gain of operational amplifier 808. The amplified feedback signal is then passed to a peak detector circuit comprised of potentiometer 824 which also could be replaced with a fixed resistor, diode 840 and capacitor 825, all of FIG. 8, where the transient current through the EL panel is peak measured to produce the signal V PEAK, which represents the largest value of the current through the EL panel. V PEAK is compared to an adjustable reference potential DIMMER VREF by LM339 comparator 809. In the preferred embodiment, DIMMER V REF is adjusted off-chip, for example from a dashboard of an automobile in one application of the preferred form of the present invention. It is understood that one could easily supply a non-adjustable reference voltage such as V REF which is used in the voltage multiplication stages of the present invention. Based on the comparison, a mutually exclusive two-bit signal (labeled V COMP and VCOMP INV of FIG. 8) is generated from the output of comparator 809 and is sent to binary up/down counter 905 of FIG. 9 to indicate that a peak measured current through the EL panel that was either greater than or less than the presettable DIMMER V REF signal.

Referring to FIG. 9, the above-described comparison results in either a count-up or a count-down combination of signals being sent to the up/down counter for every change in current through the EL panel. A three-state decoder shown in FIG. 9 is included in the preferred embodiment of the present invention to prevent arbitrarily small changes in current through the panel from affecting the compensation circuits. The decoder is a controller for the up/down counter 905 (which is as 74HC193 counter available from Texas Instruments and other vendors) which does the following:

(1) If the difference between the V PEAK signal at the cathode of diode 840 and the DIMMER V REF signal is small, then counter 905 is inhibited from counting up or down.
(2) If the V PEAK signal on the cathode of diode 840 is much greater than the DIMMER V REF reference voltage, then counter 905 is allowed to count down, causing CTRIG (the inverted version of the output of counter 905) to count up, which in turn causes the period of the output of comparator 708 to increase, causing the frequency of clocking of the PAL ® control logic to decrease, which causes VHV to decrease.
(3) If the V PEAK signal on the cathode of diode 840 is much less than the DIMMER V REF reference voltage, the, counter 905 is allowed to count up causing CTRIG to count down, which in turn causes the period of the output of comparator 708 to decrease, causing the frequency of clocking of the PAL ® control logic to increase, which causes VHV to increase.

As shown in detail in FIGS. 8 and 9, this circuit is implemented using a differential amplifier stage 106 to detect the difference between the V PEAK signal (which represents the peak current through the EL panel) and the DIMMER V REF signal (which represents the presettable desired level of brightness of the panel), an absolute value detector stage 107 to detect the absolute value of the difference between two signals, and a comparator stage for comparing the magnitude of the difference with a reference voltage DELTA V REF indicative of the threshold level for allowing the up/down counter to change.

In the preferred embodiment, if the V PEAK value is much less than DIMMER V REF, then the output of inverter 902 is held HIGH, and the output of inverter 904 is pulsed in synchronism to the 1200 Hz oscillator, causing counter 905 to count up by one step, increasing the driving frequency of the voltage multiplier, and causing VHV to be increased. If the V PEAK is much greater than DIMMER V REF, then VHV is decreased by decreasing the count of the binary counter 905. Since the count control inputs to counter 905 are low active, a COUNT UP command is generated by holding the output of inverter 902 HIGH (which holds the COUNT DOWN input inactive) and pulsing LOW the output of inverter 904 (which drives the COUNT UP input of binary counter 905) to increase the count which in turn increases the driving frequency of the ternary counter controlling the exponential voltage multipilier. Thus a closed feedback loop is established such that if the peak feedback voltage V PEAK is greater than the reference potential of DIMMER V REF and the difference is greater in magnitude than the DELTA V REF, the binary value output of counter 905 is lowered, which in turn causes the exponential voltage multiplier 100 to decrease the applied EL potential until the peak value is less than or approximately equal to DIMMER V REF. Thus, VPEAK is maintained about DIMMER V REF.

As will be understood by those skilled in the art, to prevent continuous oscillation of the binary counter clock trigger signal (CTRIG which is the inverted output of counter 905) when very small changes in voltage across the EL panel are sensed, the dead space comparator 806 was introduced to add a third state for changing the input to counter 905 from count-up and count-down states to count-up, count-down and do nothing. If V PEAK is within DELTA V REF of DIMMER V REF, then the output of comparator 806 (DELTA VCOMP) is LOW. Through logic gates 901 and 903 the output of inverters 902 and 904 are held HIGH, disabling the updown counting until the peak voltage V PEAK is significantly different from DIMMER V REF.

An inherent feature of the up/down counter 905 of the preferred embodiment of the present invention is that if left uncontrolled, it is possible that the output of updown counter 905 would roll over. In other words, 1111 to 0000 or 0000 to 1111. This would result in incorrect operation of the compensation circuit. Thus, hardware limiters are incorporated into the design. Since the output of the invertors 906, 907, 908 and 909 of FIG. 9, are binary representations of a physical count, that is to say something non-zero is to be counted, the count CTRIG is to be limited to $0001 \leq CTRIG \leq 1111$. Using the preferred embodiment, there are 15 possible values representing 15 possible clocking rates for the control of the voltage multiplier. However, those skilled in the art will understand that the number of events can be increased or decreased to provide finer or coarser granularity in the counter changes, and hence provide a greater or fewer number of clocking rates.

When the output of counter 905 is 0000, (CTRIG=1111) and the output of inverter 904 is switched LOW (which commands the counter 905 to next count down), the output of counter 905 must be maintained at 0000. This is accomplished in the following logical manner. By inverting the output of inverter 902 through inverter 911 and by driving this signal through AND gate 914, the output of counter 905 is inverted through gates 906, 907 and 908 and fed into AND gate 913. The output of gate 913 is run into AND gate 914. The output of 909 is also fed into the AND gate 914. Thus, when the output of binary counter 905 is 0000, the inverted signals fed into the AND gates will be 1111. When the output of inverter 902 goes LOW, the output of inverter 911 goes HIGH, causing the signals from gate 914 to also go HIGH. The output of 914 is run into the CLEAR input of counter 905, which causes the output of counter 905 to be 0000 and maintains CTRIG at 1111 even in the presence of more count-down signals.

Referring to FIG. 9, if the output of counter 905 is at 1110(CTRIG equals 0001) and counter 905 is instructed to count up (from a signal from inverter 904 which goes LOW momentarily, while inverter 902 is HIGH), then the three data outputs labeled Q3, Q2 and Q1 from counter 905 are NANDed (through distributed logic gates 912, 915 and 916) together with the inverted output from Q0 and the inverted output from inverter 902 (through inverter 910). This output is fed into counter 905 as a parallel load command on the LD input of counter 905. The number 1110 is hardwire loaded at the data inputs D3, D2, D1 and D0, respectively. By this mechanism the binary counter CTRIG is restricted to values between a binary 0001 and a binary 1111. Thus, rollover from 1111 to 0000 or 0000 to 1111 is prevented.

The four-bit CTRIG signal is fed into a binary comparator 708 on FIG. 7, part number 74LS85(available from Texas Instruments and other vendors), and compared with the output of a binary counter 707, part number 74LS163 available from Texas Instruments and other vendors. The binary counter is driven by an astable multivibrator, not shown, which was described above in conjunction with FIG. 3. The astable multivibrator 120 and the divide-by-2 counter 119 as was previously described is not shown in the electrical schematic diagram level of the preferred embodiment of the present invention since it is considered amply within the skill of those artisans practicing in this art to implement an astable multivibrator to form a free-running clock of a selected frequency. In the preferred embodiment of the present invention, the astable clock has a preselected operating frequency of approximately 150-250 kHz. This free-running astable clock frequency is used to drive binary counter 707 which performs a continuous circular count from 0000 through 1111, which rolls over to start again at 0000 unless it is prematurely cleared by the CL command line shown in FIG. 7. The outputs Q0-Q3 of binary counter 707 are used to drive the A-side of binary comparator 708 at inputs A0-A3 respectively. The B-side of binary comparator 708 receives the CTRIG signal which is the inverted version of the output of the up/down counter 905 of FIG. 9. When the A-side count equals the B-side (CTRIG), a transition (a negative going signal) is produced on the B>A output of comparator 708 which in turn is used to drive PAL ® 701 and 702. A negative transition on the B>A output of comparator 708 will also cause binary counter 707 to be cleared to begin counting once again at the 0000 state.

It will be understood by those skilled in the art that in the preferred embodiment of the present invention the value CTRIG from the up/down counter of FIG. 9 represents the binary value to which binary counter 707 is to count up to before resetting and beginning its count over again. Each time the binary counter 707 counts up to match and exceed the output value (CTRIG) of binary counter 905, the comparator produces an output transition which is used to clock the PAL ® circuits driving the stages of the voltage multiplication ciruit. Thus, if the count on binary counter 905 is reduced, the amount of time it takes binary counter 707 to count up to a matching value is reduced, and the time between transitions on the B>A output on comparator 708 is increased, resulting in a lower clocking frequency for the PAL ® chips. If the value on binary counter 905 is increased, the time between transitions on the B>A output of comparator 708 is decreased, which increases the frequency of clocking of the PAL ® circuits 701 and 702 which drive the voltage multiplication circuit.

It will be understood by those skilled in the art upon reading and understanding the present specification along with the drawings that a wide variety of techniques may be used in both analog and digital implementations to accomplish the aforementioned feedback mechanism as it is used to vary the magnitude of the voltage on the exponential voltage multiplication circuit. For example, rather than using binary counters and binary comparators to generate a variable clocking frequency in proportion to the current through the EL panel, a voltage to frequency converter could be used to directly control the frequency of clocking of the control circuitry of the exponential voltage multiplication circuit in proportion to the changing characteristics on the EL panel. Other variations using binary counters would be to continually load a presettable binary up/down counter with the appropriate clocking frequency, the preset value of which may be controlled by the feedback mechanism. Other equivalent structures for implementing the control of the voltage multiplication circuit in response to changing characteristics on the EL panel are too exhaustive to enumerate here. However, it is manifestly intended that the equivalent structures for controlling the magnitude of the voltage produced by the voltage multiplication circuit in response to changing characteristics on the EL panel are covered by the claims appended hereto.

Compensation Control of the Pulse Width of the Voltage Applied to the EL Panel As was previously discussed, the preferred embodiment of the present invention includes a compensation technique for narrowing the pulse width of the applied voltage pulses to the EL panel in response to changing characteristics of the EL panel. The narrowing of the pulse width is accomplished in the preferred embodiment in conjunction with the increased magnitude of the pulses as applied to the EL panel to maintain the same radiation (light) output from the EL panel as it ages. Since increased driving potential on EL panels tends to increase the rate of aging, and since it has been postulated that narrowing the pulse width of the increased driving potential can reduce the acceleration of the aging, the preferred embodiment of the present invention incorporates both pulse width narrowing and increased potental driving of the EL panel as the panel ages.

The switching of the EL panel potential can be done using a 67% duty cycle that contains no DC bias which is the previously mentioned 3-state waveform shown on line 1301 of FIG. 13.

The duty cycle (postulated to be another factor in the aging of the panel) can be decreased or increased through pulse-width modulation of the applied potential. The pulse-width modulation is accomplished through the following steps. First, the amplified current through the panel is monitored in the manner discussed above by operational amplifier 808 shown in FIG. 8 to produce the signal V AMP representative of the current through the EL panel. When the signal VAMP falls below a given level (preselected by the reference voltage signal PWM V REF), the output of comparator 709 shown in FIG. 7 toggles HIGH. This output value is latched by flip-flop 710 (part number 74HC74 available from Texas Instruments and other vendors) which is being clocked at a very high speed (approximately 150–250 kHz from the astable multivibrator, not shown). This buffered HIGH value is ORed with the complemented output of flip-flop 601 (part number 74HC112 also available from Texas Instruments and other vendors) through OR gate 605 (part number 74HC32, also available from Texas Instruments). The output of OR gate 605 is level shifted by comparator 607 which drives the H-bridge. The buffered HIGH value is also ORed with the complemented output of flip-flop 602 (also part number 74HC112) through OR gate 604 (also part number 74HC32). This OR output is level shifted by comparator 606, and is also used to drive the H-bridge.

Flip-flops 601 and 602 are connected to form a 3-state counter such that the H-bridge is controlled in a pulse-pulse-idle sequence. The sequence begins with the complementary output of flip-flop 602 producing a LOW signal to drive OR gate 604 with a zero signal. The other input to OR gate 604 is driven from the PWM CONTROL signal, which is used to indicate the shut-off point of the trailing edge of the pulse applied to the H-bridge, and hence controls the pulse width of the positive-going pulse that will be applied through the H-bridge. The LOW output of OR gate 604 corresponding to the HDO signal is level shifted through comparator 606 for driving transistors Q20 and Q21. Thus, a LOW signal from flip-flop 602 and a LOW signal on the PWM CONTROL line produces a LOW signal on the output of OR gate 604, which in turn produces a LOW output signal on comparator 606.

Moving from the first state of the 3-state sequencer of FIG. 6 to the second state is accomplished by receiving a second clock pulse on the 1200 Hz oscillator line. This clock pulse clocks both flip-flop 601 and 602, changing the state of the flip-flops. In the configuration shown in FIG. 6, the second state of the sequencer is when the complementary output of flip-flop 602 goes HIGH and the complementary output of flip-flop 601 goes LOW. This LOW signal combined by OR gate 605 with the LOW signal PWM CONTROL produces a LOW output signal which when level shifted by comparator 607 drives transistors Q22 and Q23 of the H-bridge. Thus, the LOW signal HDI out of OR gate 605 results in the application of a negative voltage pulse to EL panel 608 through the H-bridge.

In a third state of the 3-state sequencer shown in FIG. 6, another clock pulse is received from the 1200 Hz oscillator clocking both flip-flops 601 and 602. In this state in the 3-state sequence, both complementary outputs of flip-flops 601 and 602 are placed in their HIGH state such that a HIGH output signal is produced on both OR gates 604 and 605. Thus it takes three clock pulses from the 1200 Hz OSC signal to complete one cycle of pulses on the H-bridge resulting in a 400 Hz frequency of pulses.

The operation of the PWM CONTROL signal for controlling the pulse width can thus be seen as described and shown in FIG. 6. In the preferred embodiment of the present invention, if the PWM CONTROL signal is left LOW, the width of the pulses applied to the EL panel 608 is determined strictly by the pulse width of the 2-state counter comprised of flip-flops 601 and 602. When the PWM control signal goes HIGH, synchronized with the 1200 Hz oscillator clock, the PWM CONTROL signal serves to shut down the pulses prematurely from flip-flops 601 and 602. The earlier the shut-down of the pulses due to the control signal PWM CONTROL, the narrower the pulse width. Thus, the timing of the PWM CONTROL signal serves to pulse width modulate the pulses as applied to EL panel 608 in response to the changing characteristics of the EL panel as sensed by the signal V AMP.

Referring once again to FIG. 7, the PWM CONTROL signal is synchronously reset with the 1200 Hz oscillator by flip-flop 712 which is, in the preferred embodiment, a 74HC74 device also available from Texas Instruments. Flip-flop 710, which receives the compared value from signals V AMP and PWM V REF as compared by comparator 709, is clocked at the higher frequency astable clock at aproximately 125–250 kHz. The PWM CONTROL signal is then synchronized with the lower frequency 1200 Hz clock through flip-flop 712.

At FIG. 7, when V AMP (the feedback signal indicating the current through the EL panel) falls below PWM V REF, a HIGH signal is sent through latching flip-flop 710 to both the OR gates (604, 605) and is synchronized with the 1200 Hz fixed H-bridge drive clock through flip-flops 601 and 602. This forces both HD0 and HD1 signals HIGH, turning off the drive to the H-bridge. Thus, when the output current of the EL panel (as amplified and fed back by signal V AMP) is less than the reference voltage PWM V REF, the drive to the H-bridge is turned off, prematurely narrowing the pulse width. It should be noted that this does not affect the period of the wave form that drives the H bridge, but merely decreases the length of time positive or negative VHV is applied, and increases the length of time zero voltage is applied for one period of the driving wave form.

Thus, a summary of the circuit operation in order of events is:

(1) VHV is switched across EL panel 608 of FIG. 6 at a fixed voltage;
(2) the switched voltage across the EL panel causes a current spike;
(3) the current spike is sensed by a resistor 603 of FIG. 6 at the base of the H-bridge;
(4) the voltage across the resistor 603 is buffered by operational amplifier 807 of FIG. 8;
(5) the buffered voltage is amplified by a non-inverting amplifier 808 of FIG. 8. When V AMP is less than PWM V REF, then the H-bridge drive is turned OFF through flip-flop 710 and OR gates 604, 605;

(6) V AMP is peak detected (V PEAK) by resistor 824, capacitor 825, and diode 1N914, all of
7) V PEAK is compared by a 3-state decoder to DIMMER V REF:
(8) if |V PEAK - DIMMER V REF| ≦ DELTA V REF, CTRIG is held constant;
(9) if V PEAK − DIMMER V REF > DELTA V REF, CTRIG will be incremented;
(10) if DIMMER V REF - V PEAK > DELTA V REF, CTRIG will be decremented;
(11) count the astable clock by counter 707 (identified as CCOUNT) and compare with comparator 708 to CTRIG;
(12) if CCOUNT < CTRIG, do not clock the voltage multiplier control logic;
(13) if CCOUNT ≧ CTRIG, clock the voltage multiplier control logic;
(14) if the clocking frequency remains constant, VHV is constant;
(15) if the clocking frequency increases, VHV increases;
(16) if the clocking frequency decreases, VHV decreases;
(17) continuously repeat steps 1-16.

It can be seen that the preferred embodiment is capable of changing the voltage across the panel as the panel characteristics change. Furthermore, the preferred embodiment is capable of altering the pulse width as the capacitance of the EL panel changes. This enables the EL panel to deliver a constant luminescense without increasing the aging rate of the EL panel.

The pulse width modification of the voltage pulses applied to the EL panel is graphically shown in FIG. 13 for a new and aged panel. Although the pulses are narrowed in response to the compensation feedback signal for an aged panel, the frequency of applying the pulses is held constant, as shown on line 1305.

FIG. 10 provides a map for the circuit diagrams. In FIG. 10, box 1001 refers to FIG. 4. The inputs to FIG. 4 are the reference voltage V REF, an astable multivibrator clock and the TCOUNTER BUS control signals. V REF is used by the comparators to level shift the control signals from the TCOUNTER BUS which controls the states of MOSFET switches Q3–Q8 of FIG. 4. The astable clock controls the switching for transistors Q1 and Q2 and is not shown. The TCOUNTER signals are generated by the PAL logic of FIG. 7. The output of Fig. 4 is V STAGE 2, and in the preferred embodiment the V STAGE 2 output voltage is approximately 100 volts DC peak for a no-load condition with a supply voltage of approximately 13.6 volts DC. FIG. 4 includes the input stage and stages 1 and 2 of the exponential voltage multiplier circuit.

Box 1002 refers to FIG. 5. This Figure includes stages 3, 4 and 5 of the exponential voltage multiplier circuit, as well as output filter capacitor C6 which provides a relatively steady power supply to the H-bridge on the output line VHV. The inputs to FIG. 5 are V STAGE 2 which is the input voltage for stage 3 from FIG. 4 of the voltage multiplier circuit, the level shifter reference signal V REF and the TCOUNTER control bus which determines which MOSFET switches are ON and OFF in stages 3, 4 and 5 of the voltage multiplier. The output of FIG. 5 is VHV which is in the preferred embodiment approximately 800 volts DC under no-load conditions with a supply voltage of approximately 13.6 volts DC.

Box 1003 of FIG. 10 refers to FIG. 6 which includes the pulse width modulator control circuits and the H-bridge. The inputs to FIG. 6 are VHV which is used to drive the H-bridge, the 1200 Hz OSC oscillator clock signal, the PWM CONTROL signal for controlling the pulse width of the pulses applied across the EL panel, and the level shifter reference voltage V REF. The output of FIG. 6 is the V FEEDBACK signal which is the voltage across the current sense resistor 603 at the base of the H-bridge which senses current through the EL panel.

Box 1004 of FIG. 10 refers to Fig.7 which includes the system clock and control logic. The inputs to FIG. 7 are CTRIG which is the 4-bit clock count value used to control the frequency of operation of the ternary counter, V AMP which is the amplified peak detected signal representing the peak current through the EL panel, PWM V REF which is a fixed reference voltage used to determine the initial pulse width on the EL panel, the 1200 Hz OSC clock and the astable clock. The outputs of FIG. 7 are the TCOUNTER BUS control signals used to control voltage multiplier of FIG. 4 and 5, and the PWM CONTROL signal which drives the PWM control circuitry of FIG. 6.

Box 1005 of FIG. 10 refers to FIG. 8 which includes the differential amplifier stage, absolute value detector stage, and the comparator for the peak detector, all used to condition the feedback signal V FEEDBACK which represents the current through the EL panel. The inputs are DIMMER V REF, which is a selectable reference voltage used to select the brightness of the EL panel, DELTA V REF which is the minimum difference between DIMMER V REF and the V FEEDBACK signal which indicates indicates the current through the EL panel. The outputs of FIG. 8 are DELTA V COMP which is an enable signal representative of a change in the current through the EL panel which is above the DELTA V REF threshold, the V AMP signal which indicates the amplified current through the EL panel, and V COMP and V COMP INV which are the complementary signals used to control the system clock trigger (CTRIG) from the up/down counter.

Box 1006 of FIG. 10 refers to FIG. 9 which includes the system clock trigger circuitry. It has as inputs DELTA V COMP, the 1200 Hz OSC clock, V COMP and V COMP INV. V COMP is the comparison of the peak voltage to the DIMMER V REF and V COMP INV is the complement of that signal. The output of the system clock trigger is CTRIG which is a four-bit value used to determine the clocking frequency of the ternary counter.

Alternate Feedback and Sensing Techniques

The preferred embodiment of the present invention describes two methods of maintaining a constant light output from the EL panel 608. One control mechanism varies the magnitude of the high voltage applied to the EL panel while holding the frequency at which the voltage across the EL panel is pulsed constant; the second mechanism varies the pulse width of the voltage applied to the EL panel while holding the magnitude of that voltage constant. Both control mechanisms receive as input a single voltage representative of EL panel capacitance or emitted radiation.

Figure 11:
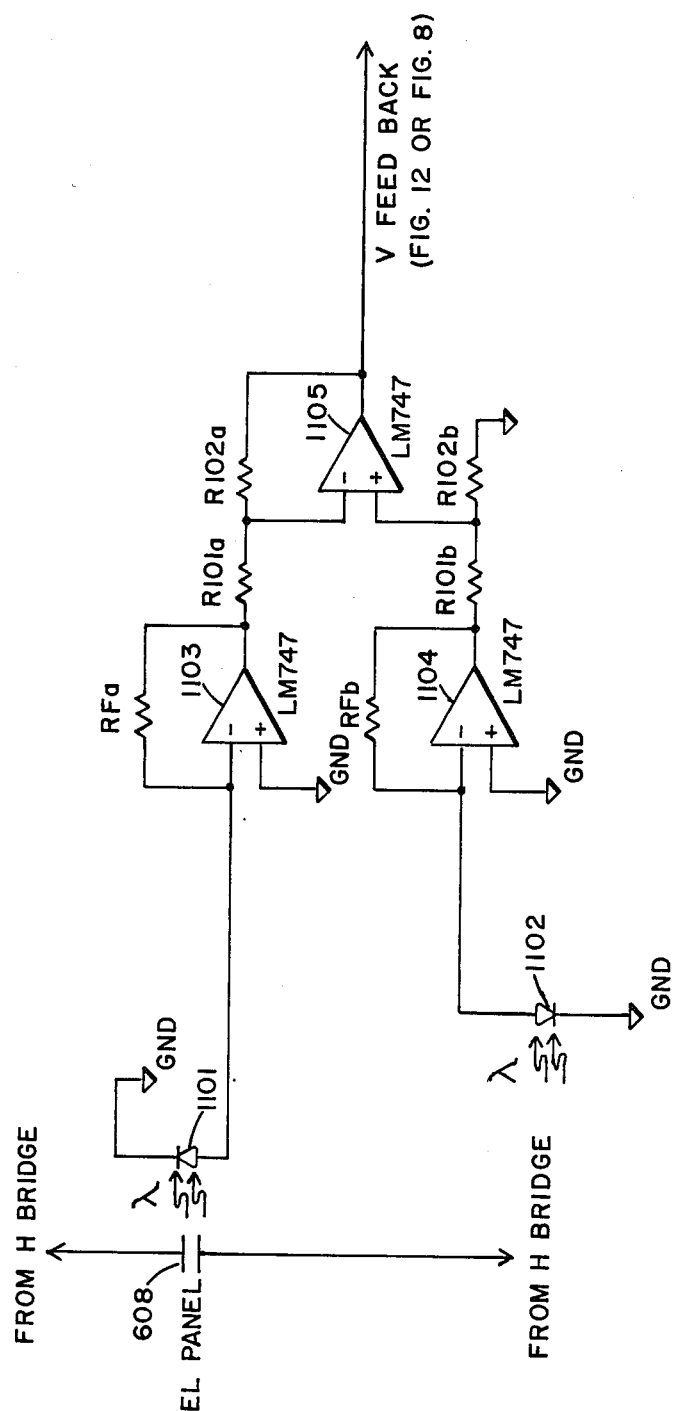
FIG. 11 is a detailed electrical schematic diagram of an alternate form of sensing changes of the radiation output of the electroluminescent panel.

FIG. 11 depicts an alternative method of providing the feedback signal. In FIG. 11, a measurement of emitted radiation is made by two photodiodes 1101 and 1102. Photodiode 1101 senses the radiation emitted from the EL panel, while photodiode 1102 senses background lighting and provides temperature compensation. Two operational amplifiers 1103 and 1104 (part number LM747 available from National Semiconductor and other vendors are used as photodiode amplifiers, a differential amplifier 1105 (also part number LM747) subtracts the magnitude of the current through background sensing diode 1102 from the magnitude of the current through the EL sensing diode 1101. The gain of amplifiers 1103 and 1104 are matched by ensuring that R101a=R101b and R102a=R102b. The resulting differential voltage, which is proportional to the EL incident radiation on the photodiode 1101 is sent to the noninverting input of operational amplifier 807 of FIG. 8. The remaining control circuitry is unchanged. The feedback voltage is compared to the DIMMER V REF reference voltage in the manner set forth above and based on this comparison, the binary trigger CTRIG is incremented, decremented or held constant to adjust the voltage applied to the EL panel. This same feedback mechanism can also be used to drive the pulse width modification circuits of the preferred embodiment.

Figure 12:
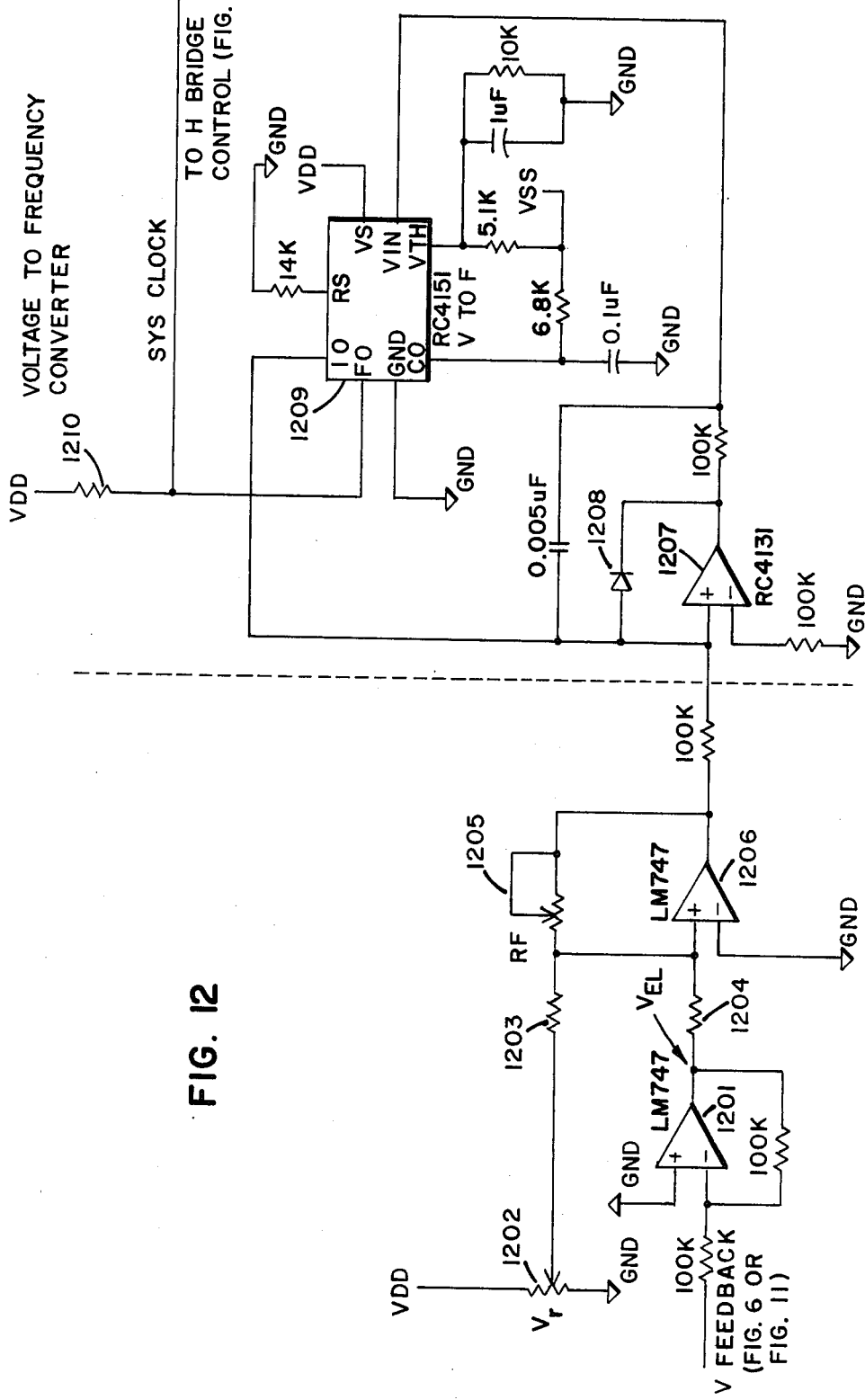
FIG. 12 is a detailed electrical schematic diagram describing the use of a voltage to frequency converter to vary the driving frequency of pulses to the EL panel in response to changing characteristics of the EL panel.

Another alternative embodiment uses a different form of compensation. FIG. 12 depicts a control mechanism which does not attempt to control the applied EL voltage to compensate for reduced light output. Instead, compensation is effected by varying the frequency with which the voltage pulses across the EL panel are applied. The faster the pulses are applied, the more light will be emitted from the EL panel. The exponential voltage multiplier is clocked at a constant high (PWM) frequency such that a fixed high voltage is generated. The feedback signal V FEEDBACK of the EL panel is fed into a unity gain inverting operational amplifier 1201 which is in the preferred embodiment an LM747. The output of amplifier 1201 is fed into an inverting summing operational amplifier 1206 (also part number LM747). The output of operational amplifier 1206 is equal to $K \times (-Vr-VEL)$, where the gain factor $K>0$ and held constant, Vr is a selectable reference voltage $\geq 0$ set by trimmer 1202, and VEL is the output of operational amplifier 1201 and is $\leq 0$. Assuming K=1, if no light is emitted from the EL panel, the output of operational amplifier 1206 is $-Vr$. When the luminescent output of the EL panel is at its maximum, V FEEDBACK is at a maximum, VEL is at negative maximum, and the output of 1206 is less negative. Operational amplifier 1207 (which is an RC4131 op amp available from Raytheon) and a voltage frequency converter 1209 (RC4151 available from Raytheon) form a voltage-to-frequency converter which requires a negative voltage from $-10$ volts to zero volts as the input to operational amplifier 1207. The output frequency labeled SYS CLOCK is used to control the frequency at which the voltage across the H-bridge is pulsed in place of the 1200 Hz OSC clock discussed above.

This voltage to frequency conversion (VFC) technique is further explained and described on page 9-10 and FIG. 2 of page 9-11 of the 1984 *Raytheon Linear Integrated Circuits* manual which is hereby incorporated by reference.

Thus, as the emitted radiation of the EL panel decreases and the feedback signal V FEEDBACK decreases to a smaller positive signal, the output of operational amplifier 1201 becomes a smaller negative signal. This in turn causes the output of operational amplifier 1206 to be closer to $-K*Vr$, a larger negative signal. The input to the VFC is made more negative, thereby increasing the pulsing frequency of the H-bridge.

The frequency modification technique for compensating for aged panels is shown graphically in Fig. 13 by comparing the voltage and current waveforms of the excitation pulses across a new and aged panel. As shown in line 1307, the applied voltage pulses are the same magnitude, but the frequency is higher. Since the pulses remain ⅓ of the period of the waveform, the pulses are narrowed as the frequency goes up. It will be appreciated by those skilled in the art that the VFC technique discussed above could also be used to drive the PWM circuits also discussed above.

FIG. 14 shows a bottom perspective view of an electroluminescent panel 1401 with the exponential voltage multiplier and the compensated control circuitry directly attached thereon. As was previously discussed, one of the preferred implementations of the present invention includes the construction of the entire compensated exciter of the present invention into a single integrated circuit except for the capacitors of the voltage multiplication stages which are mounted external to the chip. (The term compensated exciter refers to the exponential voltage multiplier and all of the associated compensating control circuitry which together make up the compensated exponential multiplication power supply of the preferred embodiment of the present invention.) In the diagram shown in FIG. 14, the circuitry is mounted on the back side or the non-light-emitting side of the EL panel; however, those skilled in the art will readily recognize that the compensated exciter of the present invention and the capacitors may be placed on either side of the EL panel, on a flexible connector to the EL panel or elsewhere.

In this preferred implementation of the present invention, integrated circuit 1405 contains all of the electrical circuitry described above for implementation of the compensated exponential voltage power supply for driving the EL panel 1401 except for the offchip capacitors. Capacitors 1406, 1407, 1408, 1409, 1410, 1411 and 1419 are in this embodiment of the present invention flat chip capacitors which correspond to capacitors C0, C1, C2, C3, C4, C5 and C6 of the voltage multiplication circuit.

The use of a low-profile or flat pack type of integrated circuit package along with flat chip capacitors allows the mounting of the circuitry onto a thick film base 1404 such as ceramic, with the electrical interconnect between the integrated circuit, the external supply, the chip capacitors and the EL panel to be plated directly thereon. This one preferred implementation results in a thin exciter circuitry in relation to the overall thickness of the EL panel 1401. This is more easily seen by the side view of the EL panel shown in FIG. 15 with the exciter circuiry mounted and expanded to show relative perspectives of the component sizes.

The output of the EL panel exciter is connected to the EL panel at conducting connections 1402 and 1403. The low voltage supply $V_{DD}$ is placed on input line 1412 with the return line 1413 grounded. Not shown in the implementation of FIGS. 14 and 15 are additional I/O lines for integrated circuit 1405 such as the DIMMER V REF signal input used to select the intensity of the EL panel radiation.

It will be appreciated by those skilled in the art that this one preferred implementation of the present invention may be varied using known existing technologies to obtain an even lower profile for the overall EL panel and its exciter. For example, thin film technologies could be used to mount the chip capacitors and the integrated circuit die directly on the EL panel, eliminating the need for a thick film ceramic substrate. In addition, since the EL panel has capacitive characteristics, the EL panel itself could be divided into portions to provide capacitance for the various stages of the exponential voltage multiplication circuit in a planar or multi-layer construction. This would eliminate the need for some if not all of the flat chip capacitors shown in FIGS. 14 and 15.

It will be readily apparent to those skilled in the art that many modifications to the preferred embodiment and the alternate embodiments of the present invention are possible without deviating from the spirit and the scope of the present invention. Special conditions employed for the implementation of the preferred and alternate embodiments are not intended to be limiting and are easily adapted to alternate implementations. For example, in the preferred embodiment of the present invention, CMOS, n-MOS and p-MOS devices have been employed at various parts of the electrical circuitry which require a supply voltage $V_{DD}$ to be between 10 and 15 volts DC typical. In other portions of the circuitry of the preferred embodiment of the present invention, the supply voltage $V_{CC}$ has been used to drive TTL bipolar-type logic which typically operates at 5 volts DC. In still further portions, a negative $V_{SS}$ supply is required which is between minus 10 and 15 volts DC typical. For the implementation of this circuit in SSI and MSI components, the use of plural power supplies is easily implemented using, for example, LM7800 series linear voltage regulators (available from National Semiconductor and other vendors) to supply the requisite $V_{DD}$, $V_{SS}$ and $V_{CC}$ supply voltages respectively from the higher 13.6 volt DC typical automobile voltage found in the automotive application of the present invention. However, it will be easily recognized by those skilled in the art that a single supply voltage may be used by implementing the preferred embodiment of the present invenion entirely in either CMOS or bipolar logic or by integrating the entire design into CMOS or bipolar logic. Thus, the specific implementation design details incorporated in the description of the preferred embodiment of the present invention has been described to enable one skilled in the art to understand and practice the present invention and is not intended to be limiting.

It will also be understood by those skilled in the art that although alternate compensation mechanisms such as increasing the voltage applied to the EL panel, narrowing the pulses as they are applied to the EL panel, and changing the frequency of the pulses as applied to the waveform may be used in separate embodiments of the present invention without reliance on the inclusion of two or more of these compensation techniques. In addition, the mechanism for detecting the changing characteristics of the EL panel such as sensing current through the EL panel or optically sensing the light output of the panel may be substituted for one another and used in combination with any one or all of the compensation techniques. All of the aforementioned combinations are intended to be included within the spirit and the scope of the present invention.

Many modifications and variations on the configuration of the stages of the exponential voltage multiplication power supply can be constructed to tailor the output voltage to whatever positive or negative magnitude is desired. Thus, the stages need not be strictly connected in a serial or series configuration in order to obtain an exponential output voltage. For example, by using additional MOSFET switches, the stages may be configured to stack voltages in the stack stage in an order which is different from the order used to store voltages in the store stage. For example, stages 1, 3 and 5 may be stacked to deliver a voltage to stage 6, which is the sum of the voltages contained on the stages stacked. However, when charging, stages 1, 3 and 5 may be placed in a store state according to their order along the series. For example, stage 3 may be charged in a store state by stacking stages 1 and 2, and stage 5 may be charged by stacking voltages from stages 1, 2, 3 and 4. Thus, using this network configuration of stages, multiplication of the input voltage raised to a fractional exponential value may be obtained. It will be understood by those skilled in the art upon reading and understanding the present specification and drawings that this out-of-order stacking of the stages is a logical extension of the exponential voltage multiplier circuit and is intended to be included within the spirit and scope of the present invention.

Although specific logic configurations and electrical configurations have been illustrated and described for the embodiment of the present invention set forth herein, it will be appreciated by those of ordinary skill in the art that any conventional logic or electrical arrangements which are calculated to achieve the same purpose may be substituted for the specific configurations shown. Thus, although conventionally available SSI and MSI logic is generally preferred due to its availability, the logic described herein along with discrete components may be implemented through the use of conventional components or it may be all combined to a greater or lesser degree in a fewer number of LSI or VLSI components. In addition, it will be readily appreciated by those of ordinary skill in the art that although positive and negative logic conventions have been used, negative and positive logic conventions may alternatively be substituted. Additionally, although specific logic components and associated conditions necessary for the operation for this system have been mentioned in order to describe the preferred embodiment of the present invention, complementary logic configurations similar to those mentioned may be alternatively employed, such as the substitution of NOR-type logic for NAND-type logic, without any deviation from the concepts of the invention disclosed.

While the present invention has been described in connection with the preferred embodiment thereof, it will be understood that many modifications will be readily apparent to those of ordinary skill in the art, and this application is intended to cover any adaptations or variations thereof. Therefore, it is manifestly intended that this invention be limited only by the claims and the equivalents thereof.

What is claimed is:

1. A power supply, comprising:
    a plurality of stages each having the ability to store energy and each having a plurality of states including at least a store state and a stack state;
    said plurality of stages being arranged in a network such that an input stage in said network is connected to receive voltage from a voltage source and such that each stage in said network other than said input stage is connected to receive voltage from at least one other stage in said network, a last stage in said network providing an output voltage,
    control means attached to said network for placing each of said stages into one of said states such that at least one of said stages is placed in said store state to receive a voltage which is approximately equal to the sum of the voltages on at least two of said stages placed in said stack state, and further including an electroluminescent panel connected to receive said output voltage.

2. The power supply according to claim 1 wherein said stages are switched capacitor networks each having the ability to store a quantum of electric charge.

3. The power supply according to claim 1 wherein said store state includes one of a charge sub-state and a hold sub-state.

4. A power supply according to claim 1 wherein each of said stages includes a switched capacitor network having the ability to store a quantum of electric charge.

5. The power supply according to claim 4 wherein said control means further comprises means for switching said output voltage into a plurality of pulses at a changeable frequency.

6. An illumination apparatus, comprising:
an electroluminescent panel having characteristics which vary; and
a voltage exciter attached for driving said electroluminescent panel, said voltage exciter comprising:
a plurality of charge storage elements connected in a series and positioned to receive a low DC voltage on a first end of said series and to deliver a higher DC voltage on a second end of said series, each of said elements having a plurality of states including at least a charge state and a stack state;
control means attached for controlling said series to place each of said charge storage elements in one of said states such that at least one of said charge storage elements is placed in said charge state for receiving a voltage approximately equal to the sum of at least two other of said charge storage elements placed in said stack state; and
connection means attached between said second end of said series and said electroluminescent panel for switching said higher DC voltage into at least one pulse such that said electroluminescent panel radiates.

7. The apparatus according to claim 6 wherein each of said charge storage elements further has at least a hold state.

8. The apparatus according to claim 6 wherein each of said charge storage elements includes at least one capacitor.

9. The apparatus according to claim 8 wherein each of said capacitors is mounted on said panel and the remainder of said voltage exciter is integrated into one or more integrated circuit chips and mounted on said panel.

10. The apparatus according to claim 6 wherein said voltage exciter is integrated into one or more integrated circuit chips and mounted on said panel.

11. The apparatus according to claim 6 further including feedback means connected between said electroluminescent panel and said control means for controlling said series in response to said varying characteristics of said electroluminescent panel such that the magnitude of said higher DC voltage on said second end of said series is modified in response to said varying characteristics.

12. The apparatus according to claim 11 wherein said feedback means senses current through said panel to detect said varying characteristics.

13. The apparatus according to claim 11 wherein said feedback means senses optical radiation from said panel to detect said varying characteristics.

14. The apparatus according to claim 6 further including feedback means connected between said electroluminescent panel and said connection means for controlling the width of said pulse in response to said varying characteristics of said electroluminescent panel.

15. The apparatus according to claim 14 wherein said feedback means senses the current through said panel to detect said varying characteristics.

16. The apparatus according to claim 14 wherein said feedback means senses the optical radiation from said panel to detect said varying characteristics.

17. The apparatus according to claim 6 wherein said connection means is further attached for switching said higher DC voltage into a plurality of pulses at a changeable frequency.

18. The apparatus according to claim 17 further including feedback means connected between said electroluminescent panel and said connection means for controlling said frequency in response to said varying characteristics of said electroluminescent panel.

19. The apparatus according to claim 18 wherein said feedback means senses the current through said panel to detect said varying characteristics.

20. The apparatus according to claim 18 wherein said feedback means senses the optical radiation from said panel to detect said varying characteristics.

21. A power supply for driving an electroluminescent panel, said panel having characteristics which change with age, comprising:
an exponential voltage multiplier operable for supplying an voltage having a changeable magnitude;
an H-bridge connected to said multiplier for receiving said voltage and for applying across the electroluminescent panel a plurality of pulses of said voltage, said pulses having a changeable pulse width;
sense means coupled to said panel for detecting changes in the characteristics of the electroluminescent panel and for producing a signal in proportion to said changes;
means connected to said sense means for varying said magnitude of said voltage and for varying said width and frequency of said pulses in proportion to said signal.

22. A method for producing a higher DC voltage from a low DC voltage, comprising the steps of:
(a) charging a first capacitor to a first DC voltage;
(b) charging a second capacitor to a second DC voltage;
(c) stacking the first capacitor with the second capacitor to produce a first stepped voltage approximately equal to the sum of the DC voltage on the first capacitor and the second capacitor;
(d) applying the first stepped voltage to a third capacitor;
(e) repeating steps (a) through (d) at least once to charge the third capacitor to a third DC voltage; and
(f) stacking the first capacitor, the second capacitor and the third capacitor to produce a second stepped voltage approximately equal to the sum of the first DC voltage on the first capacitor, the second DC voltage on the second capacitor, and the third DC voltage on the third capacitor.

23. A circuit for producing a higher DC voltage from a low DC voltage, comprising:

a first capacitor, a second capacitor and a third capacitor; and means connected to said capacitors for:

(a) charging the first capacitor to a first DC voltage, (b) charging the second capacitor to a second DC voltage, (c) stacking the first capacitor with the second capacitor to produce a first stepped voltage approximately equal to the sum of the first DC voltage on the first capacitor and the second DC voltage on the second capacitor, (d) applying the first stepped voltage to the third capacitor, (e) repeating functions (a) through (d) at least once to charge the third capacitor to a third DC voltage, and (f) stacking the first capacitor to produce a second stepped voltage approximately equal to the sum of the first DC voltage on the first capacitor, the second DC voltage on the second capacitor, and the third DC voltage on the third capacitor.

24. A power supply, comprising:

a plurality of stages each having the ability to store energy and each having a plurality of states including at least a store state which includes both a charge sub-state and a hold sub-state and a stack state;

said plurality of stages being arranged in a series network such that an input stage in said network is connected to received voltage from a voltage source and such that each stage in said network other than said input stage is connected to receive voltage from at least one other stage in said network, a last stage in said network providing an output voltage; and control means attached to said network for causing each stage subsequent to said input stage to be sequenced through at least two successive store states including sequencing through successive charge and hold sub-states, whereby each stage becomes charged to approximately the maximum voltage on the preceding stage when state stage is in its respective stack state, and for thereafter causing each subsequent stage to be sequenced through a stack state to stack the voltage to which that stage has been charged during the preceding successive store stages with the voltage to which the preceding stage has been charged when in its respective stack state, the progressive sequencing of at least two store states followed by a stack state thereby producing through the series of stages a said output voltage which is an exponential multiple of the voltage received by said input stage.

25. The power supply according to claim 24 further including an electroluminescent panel connected to receive said output voltage from said stages.

* * * * *

UNITED STATES PATENT AND TRADEMARK OFFICE
CERTIFICATE OF CORRECTION

PATENT NO. : 4,769,753

DATED : September 6, 1988

INVENTOR(S) : Orlin B. Knudson and Alexander J. Neudeck

It is certified that error appears in the above-identified patent and that said Letters Patent is hereby corrected as shown below:

Col. 2, lines 15-16, "together with means for controlling the placement of the stages in the respective states" should be deleted here and inserted in Col. 2, line 14, after "state", second occurrence.

Col. 6, line 46, "multiplication" should read --multiplier--.

Col. 10, line 18, "in.." should read --in--.

Col. 15, line 18, "$D_9 = [Q_8 Q_7 Q_5 Q_3 Q_1 + Q_9 Q_7 Q_5 Q_3 Q_1 \oplus Q_9$" should read --$D_9 = [Q_8 Q_7 Q_5 Q_3 Q_1 + Q_9 Q_7 Q_5 Q_3 Q_1] \oplus Q_9$--.

Col. 15, line 25, "Stage 3 control = $Q_4 \bar{Q}_3 \bar{Q}_2 \bar{Q}_1 \bar{Q}_1 \bar{Q}_0 + Q'_5 Q_3 \bar{Q}_2 \bar{Q}_1 \bar{Q}_0$" should read --Stage 3 control = $Q_4 \bar{Q}_3 \bar{Q}_2 \bar{Q}_1 \bar{Q}_0 + Q_5 \bar{Q}_3 \bar{Q}_2 \bar{Q}_1 \bar{Q}_0$--.

Col. 15, line 28, "Stage 4 control = $Q_6 \bar{Q}_5 \bar{Q}_4 \bar{Q}_3 \bar{Q}_2 \bar{Q}_3 \bar{Q}_2 \bar{Q}_1 \bar{Q}_0 + Q_7 \bar{Q}_5 \bar{Q}_4 \bar{Q}_3 \bar{Q}_2 \bar{Q}_1 Q_0$" should read --Stage 4 control = $Q_6 \bar{Q}_5 \bar{Q}_4 \bar{Q}_3 \bar{Q}_2 \bar{Q}_1 \bar{Q}_0 + Q_7 \bar{Q}_5 \bar{Q}_4 \bar{Q}_3 \bar{Q}_2 \bar{Q}_1 \bar{Q}_0$--.

Col. 18, line 6, after "stage" insert --108--.

UNITED STATES PATENT AND TRADEMARK OFFICE
CERTIFICATE OF CORRECTION

PATENT NO. : 4,769,753

DATED : September 6, 1988

INVENTOR(S) : Orlin B. Knudson and Alexander J. Neudeck

It is certified that error appears in the above-identified patent and that said Letters Patent is hereby corrected as shown below:

Col. 23, line 2, after "of" insert --Fig. 8--.

Col. 30, line 35, "an" should read --a--.

Col. 32, line 15, "state" should read --that--.

Signed and Sealed this

Twenty-seventh Day of February, 1990

Attest:

JEFFREY M. SAMUELS

*Attesting Officer*     *Acting Commissioner of Patents and Trademarks*